United States Patent
Brocato et al.

(10) Patent No.: US 9,798,748 B2
(45) Date of Patent: *Oct. 24, 2017

(54) DATABASE QUERY BUILDER

(71) Applicant: BioFortis, Inc., Columbia, MD (US)

(72) Inventors: Mark Brocato, Ellicott City, MD (US); Jian Wang, Germantown, MD (US); Steven Hsing-Yu Chen, Elliot City, MD (US)

(73) Assignee: BioFortis, Inc., Columbia, MD (US)

( * ) Notice: Subject to any disclaimer, the term of this patent is extended or adjusted under 35 U.S.C. 154(b) by 611 days.

This patent is subject to a terminal disclaimer.

(21) Appl. No.: 13/732,347

(22) Filed: Dec. 31, 2012

(65) Prior Publication Data

US 2013/0151572 A1    Jun. 13, 2013

Related U.S. Application Data

(63) Continuation of application No. 12/488,506, filed on Jun. 19, 2009, now Pat. No. 8,375,014.

(51) Int. Cl.
*G06F 17/30*    (2006.01)

(52) U.S. Cl.
CPC .. *G06F 17/30297* (2013.01); *G06F 17/30395* (2013.01); *G06F 17/30398* (2013.01)

(58) Field of Classification Search
CPC ................... G06F 17/30392; G06F 17/30398
USPC .......................................................... 707/705
See application file for complete search history.

(56) References Cited

U.S. PATENT DOCUMENTS

| | | | | |
|---|---|---|---|---|
| 5,579,519 | A * | 11/1996 | Pelletier | G06F 17/2205 715/234 |
| 5,909,678 | A * | 6/1999 | Bergman | G06F 17/3064 |
| 6,658,404 | B1 * | 12/2003 | Cecchini | G06F 17/30398 707/758 |
| 7,027,975 | B1 * | 4/2006 | Pazandak | G10L 15/30 704/9 |
| 7,065,524 | B1 * | 6/2006 | Lee | G06Q 50/22 |

(Continued)

FOREIGN PATENT DOCUMENTS

| | | | | |
|---|---|---|---|---|
| EP | 0387226 A1 * | 12/1990 | | G06F 15/38 |
| EP | 477152 A2 * | 3/1992 | | G06F 15/40 |

OTHER PUBLICATIONS

Notice of Allowance for U.S. Appl. No. 12/488,506, dated Apr. 6, 2012, 34 pages.

(Continued)

*Primary Examiner* — Noosha Arjomandi
(74) *Attorney, Agent, or Firm* — Brake Hughes Bellermann LLP

(57) ABSTRACT

A schema parser may determine one or more datasets of a database schema, wherein the datasets include one or more fields from a data source and represents data corresponding to the one or more fields. An input handler may receive a selection of one or more of the datasets via an interface. A translation engine may provide operations for refining the data of the selected datasets into a result set via a query, wherein the operations may be determined based on metadata defining relationships amongst the data sources and fields. A query engine may provide a graphical query including operational flow indicators indicating a directional flow of the query from the selected datasets with the selected operation to the result set.

48 Claims, 13 Drawing Sheets

(56) References Cited

U.S. PATENT DOCUMENTS

| | | | | |
|---|---|---|---|---|
| 7,236,966 B1* | 6/2007 | Jackson | ............ | G06F 17/30867 |
| 8,375,014 B1* | 2/2013 | Brocato | ............ | G06F 17/30297 |
| | | | | 707/705 |
| 2003/0004908 A1* | 1/2003 | Linthicum | .............. | G06F 17/50 |
| | | | | 706/45 |
| 2003/0020744 A1* | 1/2003 | Ellis | ....................... | H04H 60/31 |
| | | | | 715/723 |
| 2003/0220893 A1* | 11/2003 | Dettinger | ............ | G06F 17/3056 |
| 2003/0221171 A1* | 11/2003 | Rust | ........................ | G06F 17/21 |
| | | | | 715/236 |
| 2004/0088158 A1* | 5/2004 | Sheu | ................... | G06F 17/3043 |
| | | | | 704/9 |
| 2004/0122661 A1* | 6/2004 | Hawkinson | ......... | G06F 17/2785 |
| | | | | 704/10 |
| 2004/0267707 A1* | 12/2004 | Hayes-Roth | ........ | G06F 21/6218 |
| 2005/0004911 A1* | 1/2005 | Goldberg | ........... | G06F 17/30398 |
| 2005/0010557 A1* | 1/2005 | Dettinger | .......... | G06F 17/30398 |
| 2005/0039033 A1* | 2/2005 | Meyers | ............. | G06F 17/30392 |
| | | | | 713/193 |
| 2005/0114829 A1* | 5/2005 | Robin | ..................... | G06Q 10/06 |
| | | | | 717/101 |
| 2005/0120123 A1* | 6/2005 | Huang | .............. | H04L 29/06027 |
| | | | | 709/231 |
| 2007/0100809 A1* | 5/2007 | Dettinger | .......... | G06F 17/30967 |
| 2007/0174350 A1* | 7/2007 | Pell | ......................... | G06F 3/038 |
| 2007/0226196 A1* | 9/2007 | Adya | ................ | G06F 17/30457 |
| 2008/0172720 A1* | 7/2008 | Botz | ..................... | G06F 21/604 |
| | | | | 726/3 |
| 2009/0171925 A1* | 7/2009 | Elder | ................ | G06F 17/30654 |
| 2011/0313550 A1* | 12/2011 | Altshuler | ................ | A63F 13/12 |
| | | | | 700/91 |

OTHER PUBLICATIONS

Non-Final Office Action for U.S. Appl. No. 12/488,506, dated Jul. 13, 2011, 12 pages.

Non-Final Office Action for U.S. Appl. No. 12/488,506, dated Jan. 19, 2012, 28 pages.

Non-Final Office Action Response for U.S. Appl. No. 12/488,506, filed Nov. 14, 2011, 33 pages.

Notice of Allowance for U.S. Appl. No. 12/488,506, dated Nov. 29, 2012, 10 pages.

* cited by examiner

602 {
SQL:

select from

Where S3_biomaterial_type = ?  and exists ( select  * from

Where [S3_subject_id] = [S2_subject_id]

)

Selected Columns List

| Data source | Columns |
|---|---|
| Biomaterials (S3) | biomaterial_type |
| Biomaterials (S3) | subject_id |
| Subjects(S2) | subject_id |

SQLQuery select from( select [biomaterial_id] as[S3_biomaterial_id], [access_group_id_list] as

[S3_access_group_id_list], [subject_id] as [S3_subject_id]

[biomaterial_type] as [S3_biomaterial_type]

from   MART_SQB_Biomaterials S3 where  (access_group_id_list in (? ,?, ?))

)x

<u>112</u>     Where S3_biomaterial_type = ? and exists ( select * from( select S2_subject_id from( select [subject_id] as [S2_subject_id], [access_group_list] as [S2_access_group_id_list], primary_study] as [S2_primary_study]

from MART_SQB_Subjects S2 where (access_group_id_list in ( ? , ? , ?))

)x where S2_primary_study = ?

)x where [S3_subject_id] = [S2_subject_id]

)

| Data source | Columns |
|---|---|
| Biomaterials (S3) | biomaterial_type |
| Biomaterials (S3) | subject_id |
| Subjects(S2) | subject_id |
| Subjects(S2) | primary_study |

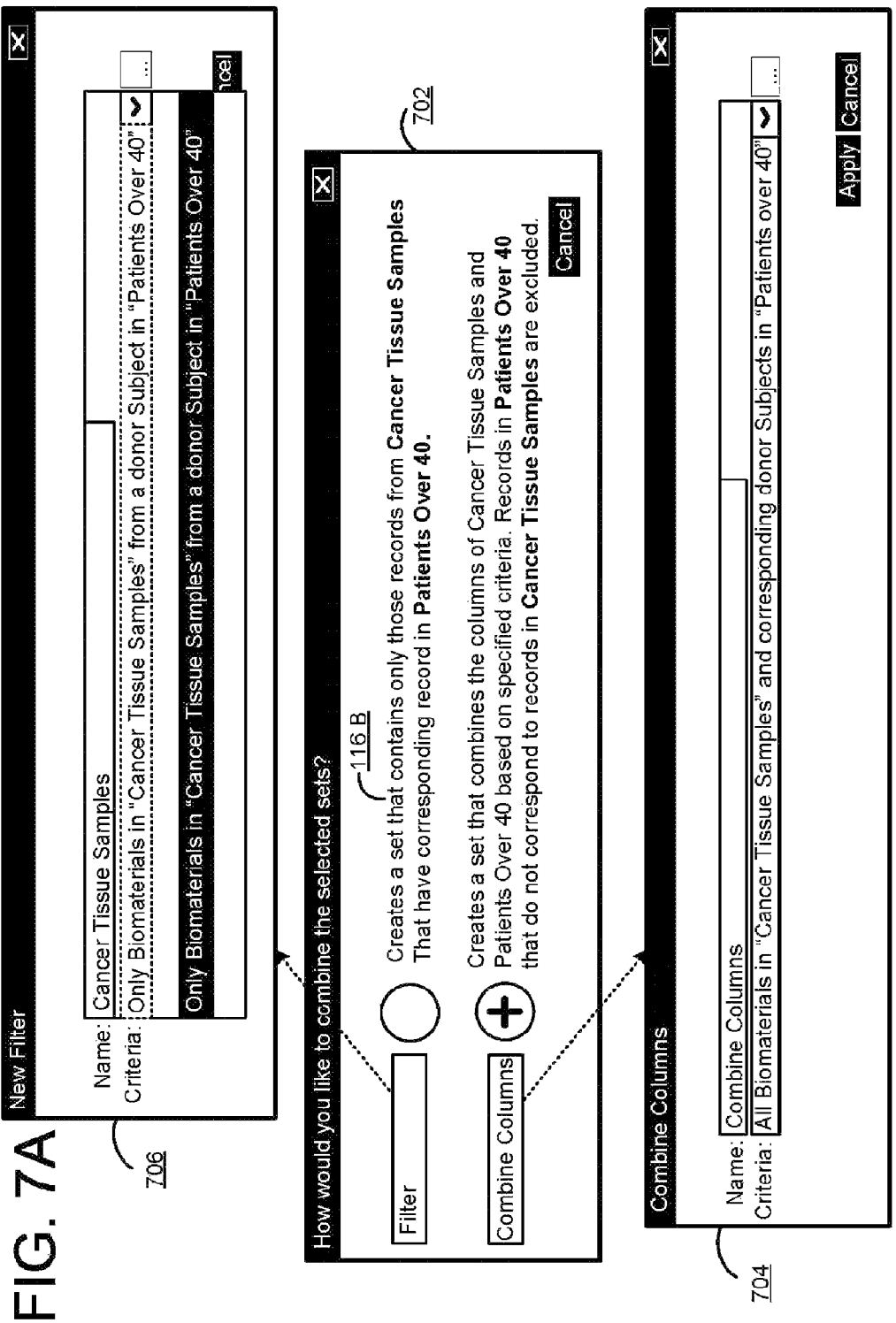

Search Datasources

Keyword: Cancer  [Search]

Subjects
*All Subjects*

Study Description
   Value:"Molecular Profiling of Breast Cancer"(80 records)
   Value:"Prostate cancer analyses-genomic and proteomic profiling"(52 records)
Study Code
   Value:"Cancer" (15 records)
   Value:"Polish Breast Cancer Study PIL" (4 records)
Medical Record - Institute
   Value:"National Cancer Institute" (3 records)
Subject Code – *The subject's user facing ID*
   Value:"Polish Breast Cancer Study PIL.1" (1 records)
   Value:"Polish Breast Cancer Study PIL.2" (1 records)
   Value:"Polish Breast Cancer Study PIL.3" (1 records)
   Value:"Polish Breast Cancer Study PIL.4" (1 records)
   Value:"Cancer.5" (1 records)
   Value:"Cancer.6" (1 records)
   Value:"Cancer.7" (1 records)

FIG. 8

DATABASE QUERY BUILDER

CROSS-REFERENCE TO RELATED APPLICATION

This is a continuation of U.S. patent application Ser. No. 12/488,506, filed on Jun. 19, 2009, and entitled, "DATABASE QUERY BUILDER," the subject matter of which is hereby incorporated by reference in its entirety.

TECHNICAL FIELD

This description relates to querying databases.

BACKGROUND

Databases may be used to store information that is later accessed through queries. Databases, including database schemas, may be designed to maximize the storage space available for the data to be stored, which may account for both the quality and quantity of data. Databases may also be optimized for rapid data retrieval. The database schema may provide a description of a structure of the database, such as definitions of the tables, fields in each table and relationships between the fields and tables. Queries to the database to retrieve or otherwise access the data, as stored in the database, may be designed based on the database schema. Thus, a user may need to have familiarity with the database schema and other database design concepts to construct efficient and/or useful queries for accessing data from a database.

SUMMARY

According to an example implementation a system is provided. A database schema may include a plurality of data sources, each data source including one or more fields for storing data, and metadata defining relationships amongst the fields. A schema parser may determine one or more datasets of the data from the database schema, wherein a dataset includes one or more fields from a data source of the database schema and represents the data corresponding to the one or more fields. An input handler may receive a selection of one or more of the datasets via an interface. A translation engine may provide operations for refining the data of the selected datasets into a result set via a query, wherein the translation engine is configured to determine which operations to provide based on the relationships from the metadata, wherein the input handler may receive a selection of one of the operations provided by the translation engine. A query engine may provide a graphical depiction of the query via the interface, the graphical query including operational flow indicators indicating a directional flow of the query from the selected datasets with the selected operation resulting in the result set.

According to another example implementation, a method is provided. For each of a plurality of datasets represented in a graphical depiction of a query of a database, it may be determined whether each dataset is a source set or a result set, wherein the graphical query includes a directional flow indicator indicating an operation to be performed on one or more source datasets that result in a result set. A target set of the graphical query may be identified from amongst the result sets, the target set including a result set of the graphical query wherein the graphical query does not include an outgoing directional flow indicator from the target set to another result set. For each dataset of the graphical query, beginning with the target set, the operation associated with that dataset and which fields of which data sources of the database correspond to the dataset may be determined. A query code statement may be constructed for each dataset, beginning with the target set and recursively processing the graphical query until the source datasets have been processed. A structured query corresponding to the graphical query and including the query statements may be assembled, wherein the query statement of the target set embeds the query statements of the other result sets and source datasets. Data from the database corresponding to the target set of the graphical query may be returned based on an execution of the structured query against the database.

According to another example implementation a system is provided. An input handler may receive a keyword by which to search a content index of a database for a corresponding data source from a plurality of data sources associated with the database, the data sources including data sources, fields and data populating the database. A search engine may search the content index for the keyword, and provide a result list of data sources from the content index corresponding to the keyword. The input handler may receive a selection of a data source from the result list. A schema parser may identify the corresponding data source, field and/or data for the selected data source. A query engine may provide, responsive to the selection of the data source, a graphical icon representing the corresponding data source, field and/or data in a graphical query, wherein the query engine may query the database for the selected data source based on the graphical query.

According to another example implementation a method is provided. Which of a plurality of operations may be performed on one or more datasets of a graphical query may be determined based on metadata associated with the data of the database. Natural language expressions (NLEs) of the operations may be determined from the metadata. An alias corresponding to one or more of the datasets, wherein the alias includes a user-provided phrase by which to refer to the corresponding dataset may be determined from the graphical query. The NLEs of the operations including the aliases of the one or more datasets may be provided. A selection of one of the provided operations may be received. A graphical depiction of the selected operation on the one or more datasets on the graphical query, and the resulting datasets, may be rendered in the graphical query.

According to another example implementation a method is provided. A graphical user interface may be provided, the graphical user interface may allow a user to generate a graphical representation of a structured query for data of a database. Selections of dataset icons and operations to perform on the dataset icons may be received via the graphical user interface. For each selection, the graphical representation of the structured query may be generated in the graphical user interface, the graphical representation including the dataset icon and/or representation of selected operation. The structured query may be generated based on the graphical representation. The structured query may be executed against the database. Results of the execution of the structured query may be provided.

The details of one or more implementations are set forth in the accompanying drawings and the description below. Other features will be apparent from the description and drawings, and from the claims.

BRIEF DESCRIPTION OF THE DRAWINGS

FIG. 6B is example query code that may be generated in converting a graphical query into a structured query.

FIG. 6C is example query code that may be generated in converting a graphical query into a structured query.

FIG. 7A is a block diagram of an example operation of the system of FIG. 1.

FIG. 8 is a block diagram of an example result of a search operation of the system of FIG. 1.

DETAILED DESCRIPTION

Figure 1:
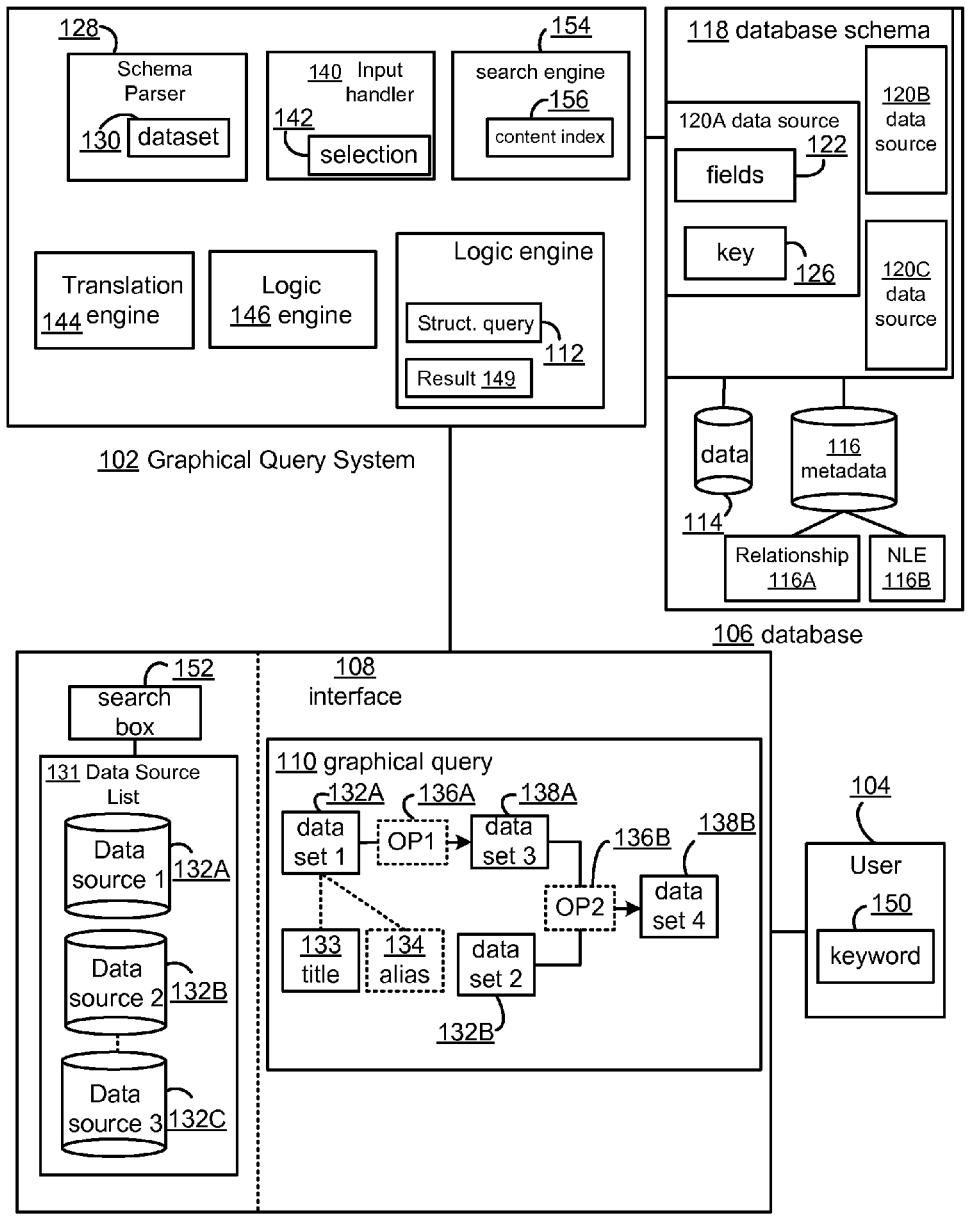
FIG. 1 is a block diagram of an example graphical query system, according to an example implementation.

FIG. 1 is a block diagram of an example graphical query system 102 that may allow a user 104 to graphically build a query to extract information from a database 106. The graphical query system 102 may allow the user 104 to graphically build a structured query 112 to run against the database 106, without the user 104 having prior knowledge of how data is stored or organized in the database 106 (e.g., which tables and/or fields are used to store various data values, which fields operate as primary and foreign keys, etc.) and without knowledge of how to develop the structured query 112 in a querying language.

The graphical query system 102 may provide the user 104 with an interface 108 that may include tools for building a graphical query 110. The graphical query system 102 may allow the user 104 to select (e.g., drag and drop) icons corresponding to structural components of the database (i.e., components that reflect the structure or organization of the database) into the graphical query 110 (or canvas of the interface 108 on which the graphical query 110 is built and/or displayed). In addition, the system 102 may suggest structural components of the database for the user to use in developing a graphical query based on natural language input from the user. The system 102 may further suggest combinations or other various operations that may be performed on the selected components when developing a query. The user 104 may select any of the suggested combinations of the components, or use other combinations that may not have been suggested by the system 102 to filter and/or combine the data, to define a final or target set of data from the components. Once the user has defined an acceptable target set within the graphical query 110, the graphical query system 102 may process the graphical query 110, build a corresponding machine-readable structured query 112 in a query language and execute the structured query 112 against the database 106. The system 102 may return, to the user, the target set of data generated as a result of the execution.

As the user 104 develops or builds the graphical query 110, the graphical query system 102 may present components of the database and/or suggest operations to be performed on the components in a language that may be familiar or natural to the user 104. Rather than using the naming convention as used in the database 106 to store the data 114, the graphical query system 102 may allow the user 104 to enter aliases 134 for the data components of the database and/or relationships between the components. For example, rather than providing the user 104 with the option of, e.g., "filtering set 1 by set 2," the system 102 may provide the user with a natural language expression 116B, e.g., "Select the subjects of the study that are over age 40." As will be described in more detail below, the suggested operations and/or their natural language expressions (NLEs) may be determined by the graphical query system 102 based on a combination of metadata 116 and/or user-provided aliases 117 associated with the data 114 or components of the graphical query 110.

The graphical query system 102 may automatically generate the machine-readable structured query 112 for querying the structured database based on the user-generated graphical query 110. The structured query 112 may be used by backend components of the system 102 to query the database 106 for the target data set, which may be returned to the user 104. As referenced above, the graphical query system 102 may allow the user 104, who may or may not have prior knowledge of how to construct the query 112 in a query language such as structured query language (SQL), to graphically construct the graphical query 110 that then may be converted automatically into the corresponding structured query 112 for querying the database. The graphical query system 102 then may return the target dataset that may be retrieved from the database 106 based on the structured query 112. The target dataset may be returned in a format specified by the user 104.

The graphical query system 102 may allow the user 104 to directly and graphically construct the graphical query 110 from which the system 102 may construct the corresponding machine-readable structured query 112 for querying the structured database, rather than requiring the user 104, who may or may not be familiar with the data 114 of a database 106, database design, and/or query design concepts to try to explain his or her requirements to a database expert who will try to construct a corresponding structured query. The graphical query system 102 thus may help bridge and/or eliminate any disconnect that may occur between the user 104 and the database expert.

One example application of the graphical query system 102 may be in the fields of sciences where the user 104 may include a scientist who may have collected, overseen the collection of, and/or is otherwise provided with access to, the data 114 that is stored in the database 106, may directly query the database 106 for target data (without consulting a database specialist to construct the query 112). Using the system 102, the user 104 may discover where various data values are stored in the database 106, select corresponding database components, graphically build the graphical query 110 and see the results of the corresponding structured query 112 being run on the database 106.

The user 104 may include any user who needs or desires to query the database 106. As indicated above, the user 104 need not have prior knowledge of database concepts and/or storage techniques as implemented by the database to construct an effective graphical query 110. Though it may be helpful if the user 104 were familiar with the content of data 114 stored in the database 106 to be queried and the structure of the database, this is not a requirement. It may be that the user 104 gains such familiarity through the use of the graphical query system 102 as will be discussed below.

The database 106 may include any collection format or storage medium for organizing and maintaining the data 114. For example, the database 106 may include a relational database, a spreadsheet, a word processing document, or other electronic data storage. The database 106, or a portion thereof, may be stored remotely from the graphical query system 102 and may be accessed via a network connection or link. In certain example implementations, the database 106 may include multiple data sources that are accessed by the graphical query system 102 and pooled together as the database 106. Various examples provided herein are directed to relational databases, but it is to be understood that the query system 102 is applicable to non-relational databases and other storage mechanisms as well.

The interface 108 may include any graphical user interface that may be used to construct and display the graphical query 110. The interface 108 may include an interface to the graphical query system 102 as displayed on a monitor or screen. Using the interface 108, the user 104 may build the graphical query 110. According to an example implementation, the interface 108 may include a browser, such as an Internet browser.

The graphical query 110 assembled or constructed by the user 104 (e.g., in the interface 108) may include various icons that correspond to structural components of the structured database 106. The icons of the graphical query 110 may be arranged in the interface 108 in a graph that includes various nodes representing components of the database and relationships between the different nodes can reflect operations to be performed on the data 114 when querying the database. For example, operational flow indicators (e.g., 136A, 136B) can indicate a refinement, combination, filtering and/or other flow of the data represented by one node to the data represented by another node. In an example shown in FIG. 7B an operational flow indicator can indicate that a "subjects" data source is refined to a data set representing patients with an age greater than 40 years old.

Figure 5B:
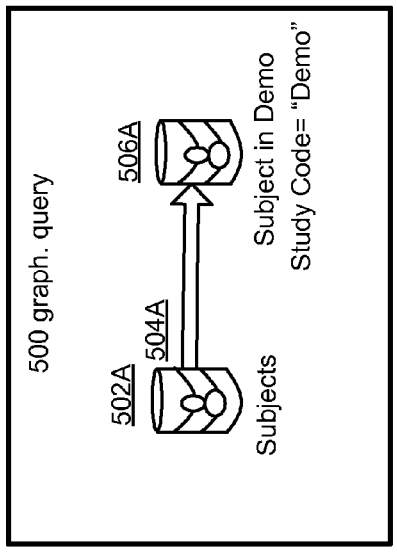
FIG. 5B is a block diagram of an example graphical query, according to an example implementation.
Figure 5B:
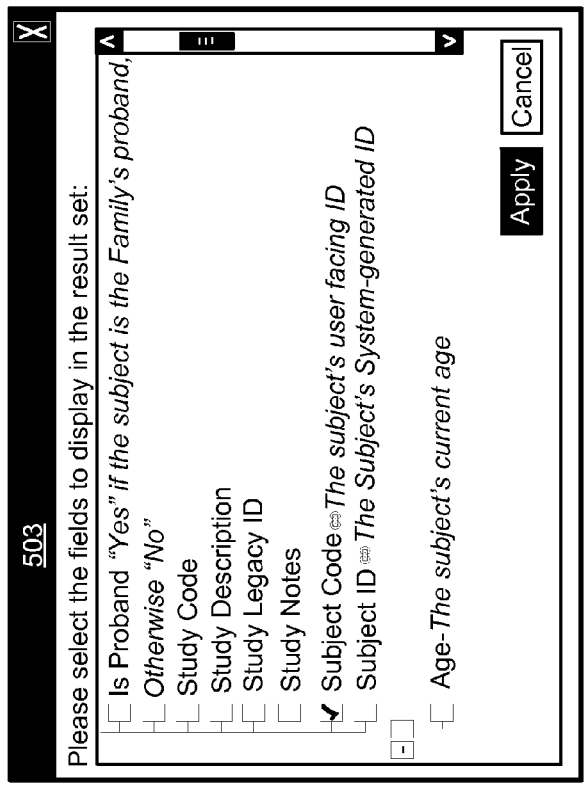
Figure 5A:
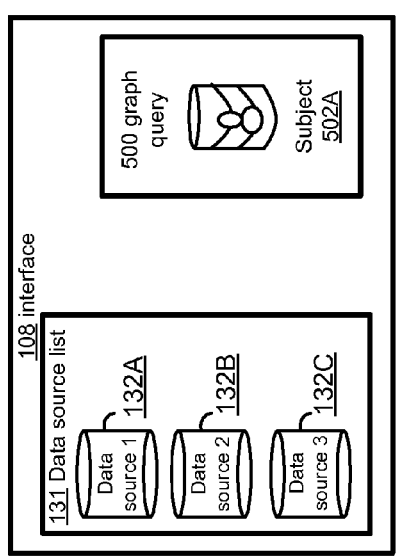
FIG. 5A is a block diagram of an example graphical query, according to an example implementation.
Figure 5A:
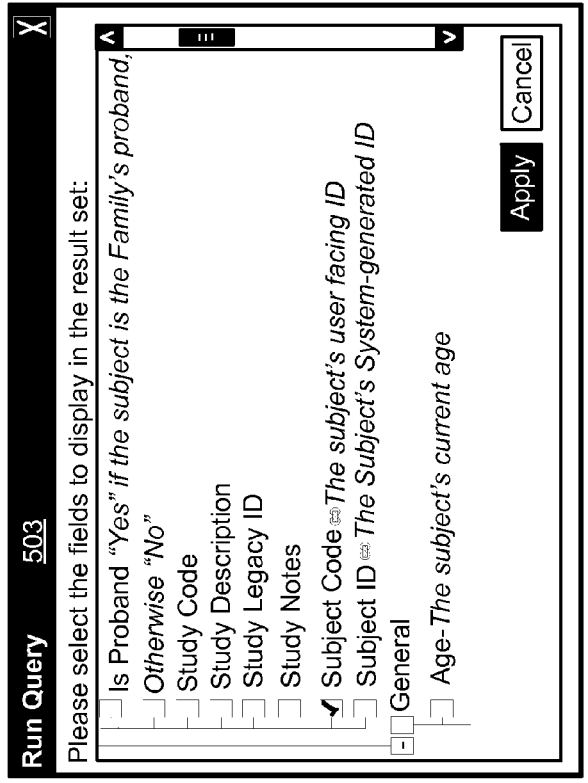

FIG. 5A is a block diagram of an example graphical query 500. The interface 108 of FIG. 5A can include a list of data source 131 that are presented to the user by the system 106 for the user to draw from when constructing the graphical query 500. The list of data sources can be represented by dataset icons 132A-C, which may represent various structural components of the data contained in one or more databases. By selecting various dataset icons from the data source list 131 and operations to be performed on the selected icons, the user may graphically define a query 500 in the graphical interface 108. The graphical query 500 may be converted or translated to a machine-readable structured query (e.g., 112) that can be run against or otherwise executed to query a database for a set of result or target information.

A user may drag one of the icons provided in the data source list 131 and can drop the icon into a frame of the user interface in which the graphical query 500 is constructed. The graphical query 500 may be built on a canvas, window, frame or other portion of the interface 108 that may be associated with but separate from the data source list 131. The result of dragging (e.g., selecting from the data source list 131) a dataset icon 132A-C and dropping (e.g., placing or otherwise signifying a movement of) the selected icon onto the graphical query 500 may produce or result in a rendering of the data source icon 502A in the graphical query 500.

If a user decides to run or execute the graphical query 500, the user can indicate this desire by, for example, clicking a "run" button in the interface 108, right clicking on an icon in the query and then clicking on a run menu item to indicate that the query should be run up to the selected icon, etc. In response to the user's indication the query should be run, a pop-up or run query box 503 may be rendered. The run query box 503 may include a window or other dialog that is produced as a result of a user interaction with the interface 108. The run query box 503 may include various options that are provided by the system 106 to the user to select from regarding an execution and/or construction of the graphical query 500. The various options may be selected by the system 106 based on the data set(s) represented by the icon(s) displayed in the graphical query 500 shown in the interface 108 and based on relationships between the icon(s) and data structures or values that are known to the system. For example, from the run query box 503 that is provided, based on the presence of the Subjects data set in the graphical query and various data fields that are related to the "Subjects" data set, the system may provide the user with the option to select which field or fields of the selected data source "Subjects" the user wants displayed in a result or target set. In the example of FIG. 5A, the user has selected the Subject Code field for display in a results list, so that the result of the query will return the subject codes of subjects in the Subjects data set.

As shown in Table 1 below, a query code statement (e.g., which may be used to build a structured query 112) for querying the structured database 106 and corresponding to the graphical query 500 of FIG. 5A may be generated by the system based on the graphical query constructed by the user. The example machine-readable query statement below is shown as SQL code, however in other example embodiments, query statements corresponding to other query languages may be provided, and the system 102 is not limited to SQL.

In the query statement the parameter "S2" may be a local id (e.g., 325 as discussed below) that corresponds to and identifies the Subjects data source 502A that was selected in the graphical query 500. The parameter S2 may correspond to an instance of the data source as represented in the canvas of the interface. Then for example, additional instances may be represented by additional identifiers, such as S3, S4 and S5. The Subjects data source 502 may have a database name, "MART_SQB_Subjects S2".

As shown in the run query box 503, the user may have selected the "Subject Code" field for display in the target or result set. Based on this selection, the query statement that is generated by the system shown in Table 1 may reflect that subject_code, given the alias S2_subject_code (e.g., as indicated by the "SELECT [subject_code] as [S2_subject_code]" line) is selected from the subjects data source (e.g., MART_SQB_Subjects S2).

Additionally, the query statement may reflect that the user has selected (or system otherwise selects by default) the "S2_access_group_id_list" and the "S2_subject_id" fields, which are aliases for the "access_group_id_list" and the "subject_id" fields, from the "MART_SQB_Subjects S2" dataset. The "Select Distinct" statement indicates that if [S2_subject_id], [S2_access_group_id_list], [S2_subject_code] contain duplicate values then only distinct values are selected. This indicates that to satisfy the user's selection of the "Study Code" field for display, that values can be extracted from columns S2_subject_id, S2_access_group_id_list, or S2_subject_code. The "WHERE access_group_id_list in (?, ?, ?)" statement allows only those records that fulfill a certain condition to be selected, where the question marks indicate that the conditions have yet to be identified and/or will be filled in later.

TABLE 1

```
Select distinct [S2_subject_id], [S2_access_group_id_list],
[S2_subject_code]
From (
    SELECT    [subject_code] as [S2_subject_code],
              [access_group_id_list] as [S2_access_group_id_list],
              [subject_id] as [S2_ subject_id]
    FROM      MART_SQB_Subjects S2
    WHERE (
              access_group_id_list in ( ? , ? , ? )
          )
)
```

FIG. 5B is a block diagram of an example graphical query 500. The graphical query 500 of FIG. 5B includes a graphical representation of a result set 506A (in addition to the data source icon 502A of FIG. 5A), which may include an icon produced as a result of the performance of an operation 504A on a component of the graphical query 500, such as the data source icon 502A. In one example implementation shown in FIG. 5B, a user may choose to perform an operation, such as a subset operation on the data source icon 502A, which generates the result set 506A that includes those records of the data source 502A whose records include the study code "Demo."

According to an example implementation, the operation may be performed or selected by the user, for example, by right clicking with the mouse or using other means of indicating that an operation is to be performed on the data source icon 502A (e.g., by combining one or more keystrokes or clicking another interface icon). Then for example, though not specifically shown in FIG. 5B, a dialog or pop-up box such as run query box 503 may be rendered from which the user may select an operation to perform and provide any necessary values. For example, for the subset operation, the user may select the "Study Code" field from the run query box 503 and enter the value "Demo," which may cause the system 102 to render the directional flow indicator 504A, indicating subset operation that is being performed on the data set 502A, and the resulting result set icon 506A. The run query box 503, as shown in FIG. 5B, is similar to that described above with reference to FIG. 5A, and indicates that in a target or result set, the user has elected to display the "Subject Code" field.

The user, at this or any other point in building the graphical query 500, may choose to continue to build the query 500 (e.g., by dragging and dropping additional data source icons onto the query 500 and/or selecting additional or alternative operations to be performed) or may choose to execute the query 500 against the database (which again may result in the run query box 503). As will be discussed in greater detail below, the user may also perform a partial execution of the query on only a portion of the components of the graphical query 500 and/or only perform a selection of the selected operations.

As shown in Table 2 below, a machine readable query statement (e.g., structured query 112) may be further developed based on the user's actions on the graphical query 500 of FIG. 5B. In Table 2, statements shown in bold text correspond to the additional statements that have been added to the structured query of Table 1, above based on the user's actions in the graphical query of FIG. 5B (e.g., selecting subset operation 504A to be performed on data source 502A). "Primary study" from the query statement of Table 2 may correspond to the selected "study code" field of FIG. 5B. Then for example, during an execution of the query statement the "?" may be replaced with the value "Demo".

TABLE 2

```
Select distinct [S2_subject_id], [S2_access_group_id_list],
[S2_subject_code]
From (
    SELECT
              [primary_study] as [S2_primary_study],
              [subject_code] as [S2_subject_code],
              [access_group_id_list] as [S2_access_group_id_list],
              [subject_id] as [S2_ subject_id]
    FROM      MART_SQB_Subjects S2
    WHERE (
              access_group_id_list in ( ? , ? , ? )
          )
)
Where S2_primary_study=?
```

Figure 5C:
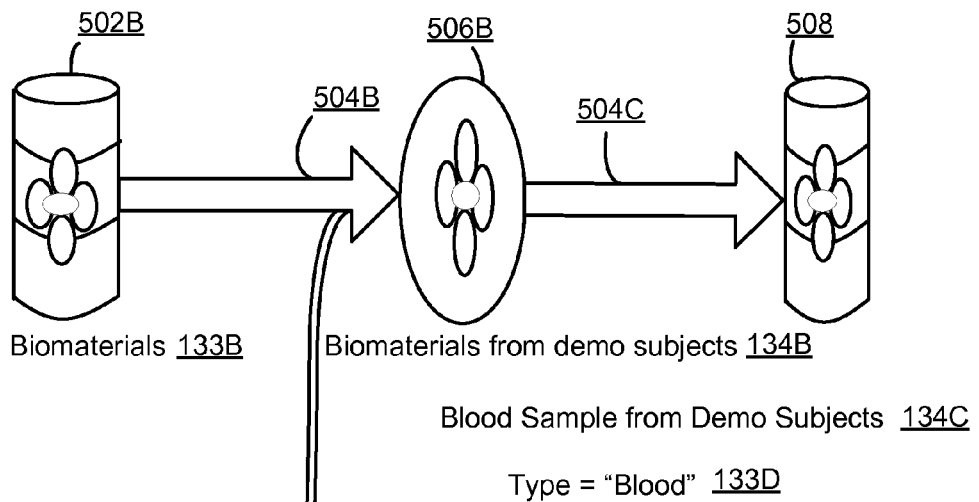
FIG. 5C is a block diagram of an example graphical query, according to an example implementation.
Figure 5C:
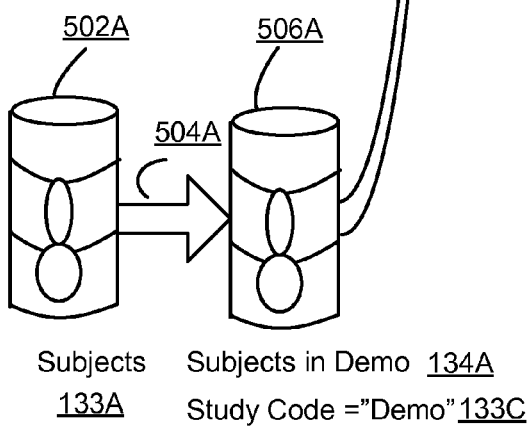

FIG. 5C is a block diagram of an example graphical query 500. The graphical query 500 of FIG. 5C may include a query that extends the graphical queries of FIGS. 5A and 5B. For example, the graphical query 500 of FIG. 5C includes an additional data source icon 502B (which may have been selected from the data source list 131). In other example implementation, the graphical queries 500 may include different components and/or operations.

The various datasets shown in FIG. 5C can be merged, sorted, and filtered, based on operations that the user performs on or selects for the graphical representations of the datasets when developing or building the graphical query shown in FIG. 5C (in the user interface). For example, the operation indicated by directional flow 504B may be selected when the result set 506A (filtering set) is dragged and dropped on top of the data source icon 502B (filtered set). The result of such a drag and drop, may cause the system to render a pop-up box from which the user may select an operation, such as the filter operation to perform. Then for example, as a result of the user's selection the system may render the directional flows 504B originating from the icons 502B and 506B and the resulting result set 506B.

According to an example implementation, the operation indicated by the directional flow 504B may include a filter operation in which the biomaterials data source 502B (filtered set) may be filtered by the result set 'subjects in demo' (filtering set) 506A to produce the result set 506B, which may be given the alias 134B "Biomaterials from demo subjects." Then for example, operation 504C (e.g., which may be a subset operation) may be applied to result set 506B to the produce target set 508. The operations 504B and 504C may be applied in a similar manner as discussed above with regards to the operation 504A of FIG. 5B.

According to an example embodiment, the physical location of objects of the query 500 may be modified by the user without changing or modifying the underlying logic of query. For example, the biomaterials icon 502B may be moved within the graphical query 500 to appear below the subjects icon 502A. The visual appearance of the graphical query is subject to the user's discretion and will not change the underlying query logic so long as directional flow indicators 504A-C do not change which icons they originate from and to which icons they result or point.

The target set 508 may include the alias 134C "Blood Samples from Demo Subjects." The alias 134 may include any phrase entered by the user by which the user prefers to refer to the identified data set. For example, if the user decides to perform an operation on the target set 508, the system 102 may refer to the target set 508 as "Blood Samples from demo subjects" (e.g., rather than the name provided to the target set 508 within the database, which may be different) when prompting the user, for example, to select which operation to perform on the target set 508. The system 102 may map for which objects of the graphical query 500, the user has provided aliases. According to an example implementation, a user may save graphical queries (e.g., 110, 500) that may be used again later as portions of or otherwise combined with other graphical queries. Then for example, the aliases 134 provided by the user may be reused as well.

If, in FIG. 5C, another node were added and/or another operation were performed on the target set 508, then the final node from the graphical query 500 may become the new (or additional) target set 508. The target set 508 may include any result set or data set from the graphical query 500 that is not combined with another data set and/or is not operated on (e.g., as indicated by the directional flows 504A, 504B and 504C). That is, for example, a directional flow indicator 504A-C does not originate from the target set 508. In other example embodiments, a user may identify which data set or data sets within a query are to be treated as target sets 508, even if the indicated data set(s) include a direction flow indicator extending away from the indicated data set. In this case, the datasets downstream of this identified target set 508 may be ignored when constructing the structured query. This may allow a user to obtain intermediate results from the execution of a graphical query 500.

Referring again to FIG. 1, the graphical query system 102 may construct the machine-readable structured query 112 (e.g., in the manner as discussed above), in a query language, from the components included in the graphical query 110. The structured query 112 may include a machine-readable query code or language that may be executed against the database 106. Example query languages that may be used to construct the structured query 112 may include, but are not limited to, SQL, XQuery, SPARQL, Quilt, XQL and Hibernate. Various examples and implementations referred to herein use SQL syntax, however the usage of SQL is for exemplary purposes only and should not be construed as a limiting embodiment or implementation.

According to an example implementation, the graphical query system 102 processes the graphical query 110 working backward from the target data set through the nodes of the graphical query 110 to the source data sets to construct the machine—readable structured query 112. For example, the structured query 112 construction may begin with the target or result data set (e.g., 138B) from the graphical query 110 and continue to process elements of the graphical query 110 in reverse order until all of the nodes and operations of the graphical query 110 have been processed, including the leaf or data source nodes 132A and 132B. Example structured queries 112 are shown, as discussed above, in Tables 1 and 2 and FIGS. 5A, 5B and 5C.

The data 114 may include any data stored in the database 106. For example, the data 114 may include data from experiments, collected from users and/or other sources. The data 114 may include data from a particular realm or subject matter, such as subject data pertaining to blood tests, or may include a broader scope such as life sciences, science in general, financial matters, etc. In other example implementations, the data 114 may include any information or values pertaining to any subject or a wide assortment of various subjects.

The metadata 116 stored in the database 106 may be used to identify relationships, descriptions and/or other annotations pertaining to the data 114 as stored in the database 106. For example, the metadata 116 may provide information pertaining to relationships 116A between data structures of the data 114. For example, the relationship metadata 116A may include a definition of a relationship between a first column of a first table of the database 106, and a second column of a second table of the database 106. The relationship information 116A may include setting a first flag and/or a second flag pertaining to whether the relationship makes sense for filter operation and/or a join operation between the first column and second column. Then for example, based on the set flag information, if the user tries to perform a filter or join operation on the first table and the second table of the database 106, the system 102 may recommend joining and/or filtering the first column with the second column based on the relationship metadata 116A.

According to an example implementation, the metadata 116 may include information 116B to facilitate the identification of data structures and/or relationships between data structures through natural language expressions (NLE) corresponding to the data structures or relationships. The NLE metadata 116B may take different forms in different implementations. The system 102 may include natural language expression metadata 116B to facilitate fill-in-the-blank statements for filter and join (and other) operations, where the blanks or variables may be filled in or replaced with data 114 of the database and/or data source to label the icons the user 104 has selected. For example, for a subset operation, a user may enter the instruction "Select those patients whose age is over 40." The NLE metadata may include a contextual database that includes, for example, synonyms of verbs such as "select," nouns such as "patient," and parameter definitions such as "age is over 40" that can be used to recognize such a NLE instruction. Then for example, based on the user input the NLE metadata 116B can be used to convert a statement like "Select those Patients whose Age is less than 40" into a machine-readable structured query statement rather than requiring the user to enter a non-NLE such as, "Filter Patients.Age<40." In another example, relationship between datasets can be recognized based on NLE statements selected by a user that are interpreted based on the NLE metadata 116.

The NLE metadata 116B additionally may be used to provide expressions to the user 104 in lieu of (or in conjunction with) technical descriptions of the operations being performed on the data. For example, rather than referring to filtering set 1 by set 2 (technical description), the natural language expression may state "selecting from set 1, those items with trait set 2." According to an example implementation, the natural language expression presented to the user may include any description or annotation to the relationship 116A anticipated to be more intuitive to the user 104, and may be based on any combination of the user's experience level, the domain of the data, the relationship involved and/or other factors. According to an example implementation, NLE metadata 116B may be used to provide different descriptions to different users. Then for example, depending on which user 104 is using the system 102, a different description may be provided.

According to an example implementation, the metadata 116 may be organized into a table including a first column or data set, a second column or data set, whether the relationship makes sense for a filter, join or other operation and the NLE metadata 116B relevant to the relationship 116A. The metadata 116 may include annotations that may be provided by a domain expert, as the relationships 116A, may vary in various implementations based on the data 114 stored in the database 106.

The metadata 116, including the relationship data 116A, may allow the system 102 to understand the relationships between the data sets 114 stored in the database 106. The metadata 116 may identify those data sets that are semantically and/or ontologically related. These identified relationships then make the corresponding data sets candidates for natural language expression recommendations of combinations and/or other operations that may be performed on selected data sources 120 A-C.

The metadata 116, according to an example implementation, may be provided to the system 102 prior to the user 104 building the graphical query 110. The metadata 116, for example, may be known ahead of time and may be based on the data 114. Then for example, after or while the data 114 is populated into the database 106, the corresponding metadata 116 may be provided to the system 102 as well.

According to an example embodiment, the metadata 116 may be pre-configured in the system 102 prior to the user's 104 operations (e.g., building the graphical query 110). For example, an administrator may define metadata 116 that indicates relationships between datasets based on known relationships between the datasets. In other example embodiments, the metadata 116 can be generated in response to user interactions with the graphical query system 102. For example, during the query building process the user 104 may determine and/or define new and/or modified relationships between datasets and/or natural language expressions, which may result in the generation of additional relationship metadata 116A and/or NLE metadata 116B that may be included within the metadata 116 stored in the database 106. By generating additional metadata in response to user interactions with the system 102, the system may "learn" about new relationships between datasets and natural language expression that are relevant to user. Metadata generated based on user interactions may be provided to all users of the system, so that users may use metadata that has been "learned" based on the interactions of other users with the system. In another implementation, Metadata generated based on a user interactions may be provided only to that user, so that the user may use personalized metadata that has been "learned" based on the user's particular interactions with the system, which may indicate relationships between datasets and NLE's that are of particular relevance to that user. In another implementation, the system may provide a user with the option to rely on metadata 116 that has been generated for all users, for an individual user, for a particular class of user (e.g., patients, or care providers, or researchers, etc.), for a particular subset of users, etc.

As was discussed above in reference to FIGS. 5A-5C, the user 104 may drag a first item and a second item (e.g., 132A-C) from the data source list 131 into the canvas used for displaying the graphical query 110, and may drop one item on top of the other and then may select an operation 136A to perform on the two items. In such a scenario, the user 104 may have selected the two items based on previous knowledge of the datasets represented by the two items and a known relationship between them. According to another example embodiment, after one item has been placed in the canvas for the graphical query 110, the user 104 may receive suggestions about other datasets that are associated with or have relationships with the dataset represented by the first item and that can be combined with the dataset represented by the first item. In this manner, a user 104 that may be unaware of datasets related to the dataset represented by the first item may browse the suggested datasets to discover datasets that are associated with (via metadata 116) the dataset represented by the first item.

The suggestions by the system 102 or possible data sources 120A-C or datasets to combine with a selected first item may be provided in response to a user request. For example, the user 104 may right-mouse-click the item in the graphical query 110, and may select from a drop-down menu, an item titled "related datasets." Upon the selection of the "related datasets" item, the system 102 may provide any other datasets 132A-C that share a relationship with the selected item based on the relationship metadata 116A. In those embodiments where there may be a large number of related datasets, the system 102 may sort the related datasets based on some sort criteria such as popularity, alphabetically, previously selected by the user, most relevant, etc. This list of related datasets may provide the user 104 with another tool by which the user 104 may easily determine with which items to build the graphical query 110 and browse the database 106.

The database 106 may include the database schema 118. The database schema 118 may include a structure or organization of data sources 120A-C or data sets of the database 106. The data sources 120A-C may include tables and/or views of the database 106. In other example implementations, the data sources 120A-C may include pointers to data sources of other networks, systems or databases as well. In general, data sources or data sets provide a structural framework to the data 114 stored in the database 116. For example, a data source can be a subset of the data 114 that includes a particular kind of data (e.g., data related to patients, data related to biomaterials, data related to clinical trials, data related to drugs, etc.), data from a particular time frame, etc.

The data sources 120A-C may include fields 122 for storing and/or organizing the data 114 within the data sources 120A-C. For example, a data source 120A may include multiple fields 122 (e.g., columns of tables and/or views), wherein the data 114 may be stored or populated as rows or records in the data source 120A. It may be that one or more of the fields 122 of the database 106, for each data source 120A-C, may be designated as a primary and/or foreign key 126. The keys 126 may include one or more fields 122, the combination of which identify a unique record, tuple or other data 114 from each data source 120A-C. According to an example implementation, the relationship metadata 116A may include relationships based on the keys 126. According to another example implementation, the relationship metadata 116A may include relationships based on non-keys fields.

The graphical query system 102 may include a schema parser 128 that is configured to determine one or more datasets 130 from the database schema 118. The dataset 130 may include any subset or combination of the data sources 120A-C, fields 122 and/or data 114 of the database 106. An example dataset 130 may include fields 122 from several different data sources 120A-C.

The datasets 130 may be made available or provided to the user 104, via the interface 108, as dataset icons 132A-C in a data source or result list 131. The dataset icons 132A-C may include any graphical and/or textual images on the interface that represent the datasets 130. Graphical and/or textual images on the icon may indicate relationships between different types of datasets by, for example, sharing certain elements in the images. The dataset icons 132A-C may include a title 133 and/or an alias 134. The title 133 may include a default title or description of the dataset 130 that may correspond to the data source 120A-C, field 122 and/or data 114 associated with the dataset icon 132A-C. The title 133, for example, may refer to the database 106, data source 120A-C and/or field 122 that corresponds to the dataset 130. The alias 134 may include a user-provided description of the dataset icon 132A-C and/or underlying dataset 130. The alias 134 may include any description provided by the user 104. Then for example, when the user 104 performs an operation on a dataset 130 that includes an alias 134, the system 102 may use the alias 134 in lieu of the title 133 when referring to the dataset 130 in the natural language expression 116B of the operation.

The alias 134 may be an example of a feature that allows the graphical query 110 to be self-documenting. Furthermore, the user 104 may include additional and/or different data on the graphical query 110 in the forms of text, images and/or numbers to make the query 110 more understandable (not shown). For example, the user 104 may choose to add text boxes around the query 110, explaining in greater detail the various components involved in the query 110 and/or purpose. Furthermore, the diagrammatic structure of the graphical query itself is often indicative of the nature of the query, making the graphical query self-documenting. Then for example, when referring back to a query 110 that has been saved, another user and/or other users may more easily understand what is happening with the graphical query 110.

The user 104 may drag and drop one or more dataset icons 132A-C from the data source list 131 into the graphical query 110. Then, the user 102 may determine one or more operations 136A-B to be performed on the dataset icons 132A-C. The operations 136A-B may include any combination, filtration, or other manipulation of the data 114 of the datasets 130. Example operations 136A-B may include, but not be limited to, a subset, subquery, filtering, combine columns, union, calculation, exclusion, and intersection operations.

As referenced above, the predefined operations 136A-B available for any one or combination of datasets 130 may be dependent, at least in part on, the relationship metadata 116A. For example, if the user 104 drags the dataset icon 132B onto the result set icon 138A, the system 102 may reference the relationship metadata 116 to determine what operations 136A-B may be performed between the two underlying data sources 120A-B, and may propose recommendations using the natural language expressions metadata 116B in collaboration with the aliases 134 and/or titles 133.

The operations 136A-B may be represented in the graphical query 110 by the arrowed lines shown in FIG. 1, or other such operational flow indicators, which may indicate a progression of the graphical query 110. The operational flow indicators may include directed lines indicating a directional flow from first dataset icon 132A to a first result set icon 138A. The operational flow indicators may indicate some operation being performed on the first dataset 130 that produces or results in the second dataset. According to an example implementation, the user 104 may manipulate the positioning of the icons within the graphical query 110 and the operational flow indicators may adjust accordingly, thus maintaining the logical integrity of the graphical query 110. For example, the example graphical query 110 shown in FIG. 1 includes a left-to-right directional flow, but other examples may include a right-to-left flow, top-down, bottom-up or other directional flow as the user 104 sees fit.

As shown in the example of FIG. 1, the application of the operation 136A on the dataset1 132A may produce the resulting dataset3 138A. The result sets 138A-B may include any intermediate datasets 130 produced as a result of performing one or more operations 136A-B on one or more datasets 132A-B or other result sets 138A-B. The result sets 136A-B may include both intermediate result set 136A and target result set or target set 138B. The intermediate result dataset3 138A may include a result set that is the result of one operation (e.g., 136A) but that is the superset or source set of a second operation (e.g., 136B). The target dataset4 138B may be a resulting dataset4 that is the result of one operation (e.g., 136B) and that does not operate as a superset to another operation. The target dataset4 138B may be returned from an execution of the graphical and/or structured queries 110, 112 with respect to the database 106. For example, the data 114 of the database 106 corresponding to the target set 138B may be returned as a result (e.g., 149) of the query 110.

As the user 104 selects the data sets 132A, 132B and the operations 136A, 136B via the graphical query 110, an input handler 140 may receive the user's 104 selections 142. The selection 142 may include any information obtained from the user 104, including via the graphical query 110. For example, the input handler 140 may receive a selection 142 that the user 104 dragged and dropped a first dataset icon 132B onto a result dataset icon 138A. The selection 142 may include an indication of which icon was dragged and an indication of the target icon onto which the dragged icon was dropped.

A translation engine 144 may be configured to provide operations that may be performed on one or more selected dataset icons 132A, 132B, 138A, 138B of the graphical query 110. The translation engine 144 may check the underlying datasets 130 (corresponding to the selected icon(s)) against the metadata 116 to determine if any relationships 116A have been defined for the corresponding data sources 120A-C and/or fields 122. The translation engine 144 then may return, via the interface 108, the natural language expressions 116B of the suggested operations 136A-B for the selected dataset icons using their corresponding titles 133 and/or aliases 134. For example, the translation engine 144 may propose a number of operations that may be performed on the data sets 132B and 138A, and the user may then select an operation, which may then be rendered or represented in the graphical query 110 as operation 136B and target set 138B.

The user 104 then may select, from the data source list 151, one of the suggested operations as determined from the metadata 116 or perform another operation on the selected dataset icons. A query engine 146 may be configured to provide the graphical depiction of the selected data sets 132A-C and operations 136A-B via the graphical query 110. The query engine 146 may provide a graphical depiction of the operations 136A, 136B (as represented by operational flow indicators) and of the result sets 138A, 138B.

As indicated above, the user 104 may manipulate the visual appearance (e.g. the position, shape, size, color, etc. of the icons) of the graphical query 110, including the placement of the components within a user interface window or canvas on which the graphical query 110 is displayed. These user manipulations, for example, may be received by the query engine 146, which may adjust the graphical query (e.g., operational flow indicators) accordingly. These visual adjustments however may not affect the logical integrity or flow of the structured query 112 produced from the graphical query 110, unless the operations 136A-B are changed (e.g., performed on different components and/or in a different order).

A logic engine 148 may generate the machine readable structured query 112 from the graphical query 110. For example, the logic engine 148 may begin processing the graphical query 110 at the final result set or target set 138B and construct query language or code for the structured query 112 pertaining to the target set 138B. Then for example, the logic engine 148 may follow the flow indicators backwards through the graphical query 110 and recursively construct the corresponding query statements for each element or component of the graphical query 110 as it is reached. Thus, the logic engine 148 may construct the query code or language for the operation 136B second, after the target set 138B. According to an example implementation, the logic engine 148 then may query the database 106 using the structured query 112 it had constructed to determine the target dataset 138B and return a result 149 (e.g., of the data 114 corresponding to the target dataset 138B) to the user 104.

Figure 6A:
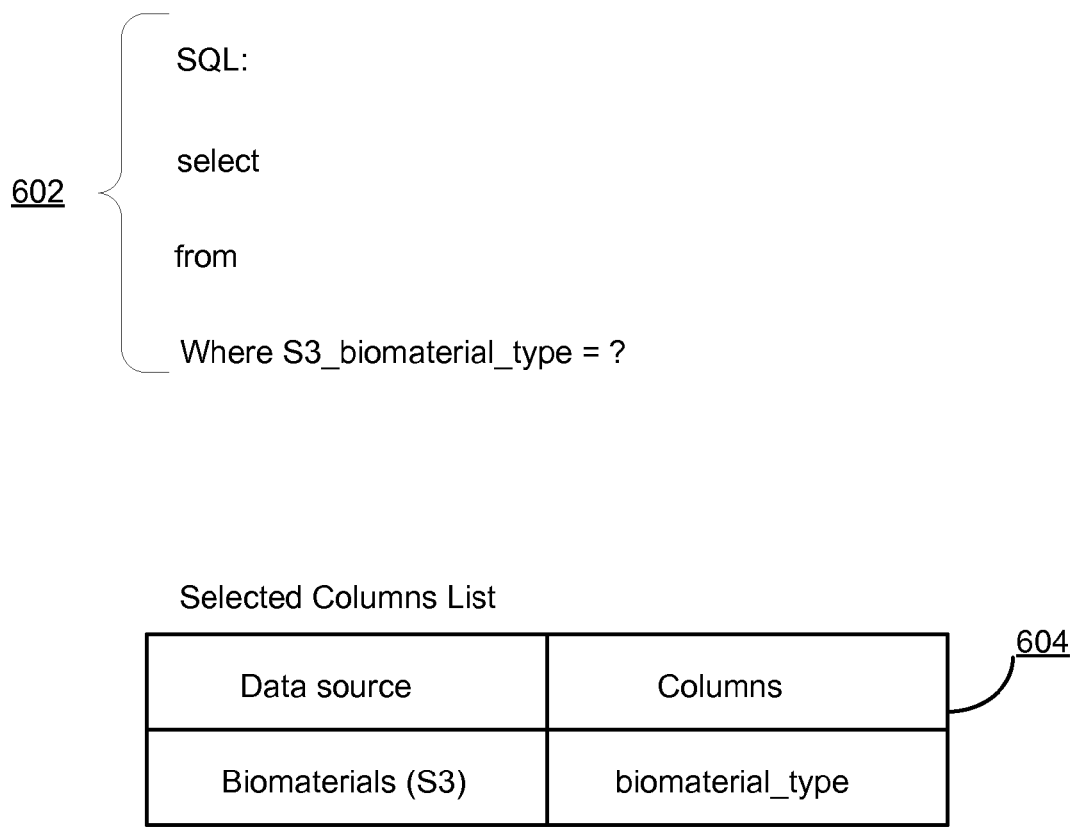
FIG. 6A is example query code that may be generated in converting a graphical query into a structured query.

The logic engine 148 may include a subroutine for processing each type of operation that can be performed on a node of the graphical query on one or more datasets. Each subroutine that processes a particular type of operation can produce a SQL substatement using datasets, parameters, and fields (each referenced by a combination of datasource local ids 325 and field id) specified by the user in the query graph. Such SQL substatements (e.g., as shown in FIGS. 6A and 6B) can be generated for all of the nodes of the graphical query, and because each of the nodes can be processed in an atomic manner, this technique can be scaled to process large queries involving large numbers of nodes. Once incorporated into a complete machine readable and machine executable SQL query, these SQL substatements produce the operations represented by each of the nodes of the graphical query when executed. It is important to note that each subroutine does not need to know anything about the other nodes in the query, with the sole exception of datasource nodes, which need to know what columns are used by downstream nodes.

By traversing the query graph starting from the root node (i.e., the target set node 508 that determines the resultant schema), the system may, for each node of the graphical query, execute the specific subroutine related to the operation represented by the node to produce a partial SQL substatement that is completed by recursive calls to the subroutines associated with the operation(s) represented by the child (upstream) node(s). During this process of tree traversal by recursive execution of subroutines, the system may compile a list of columns that are referenced by SQL substatements produced by one or more of the subroutines. When a leaf node (i.e., data source node) is reached, the logic engine 148 may use the compiled list of referenced columns to select the set of columns relevant to the table, view, stored procedure, or other database object represented by the leaf (data source) node. This ensures that each subroutine has access to each of the columns needed to perform its function.

According to another example implementation, the logic engine 148 may generate the structured query 112 for only a portion of the graphical query 110, as selected by the user 104. For example, the user 104 may activate or deactivate the various components (e.g., datasets/operations) of the graphical query 110, or may choose a particular point of the graphical query path for execution of a query to begin or end. Then for example, the logic engine 148 may generate the structured query 112 based only for those activated components in the graphical query 110 or based on the selected execution point.

The result 149 may include whatever is returned as a result of executing the structured query 112 that corresponds to the graphical query 110 against the database 106. The logic engine 148 may limit the result 149 as provided to the user 104 based on restrictions and/or accesses associated with the user 104. For example, the database 106 may include data 114 to which the user 104 does not have access. Then for example, implementing access control list (ACL) security, the logic engine 148 may return only that data 114 to which the user 104 has permission to access.

As referenced above, a user 104 who may be unfamiliar with the data 114 and data structures stored in the database 106, or may otherwise not know where to begin with selecting or finding a dataset 130, may enter a keyword 150 into a search box 152 on the interface 108. The input handler 140 may receive the keyword 150 and provide it to a search engine 154 that may look-up the keyword 150 in a content index 156. The search engine 154 then may return, based on the look-up in the content index 156, any data sets 130 in the data source list 151 that correspond or are otherwise associated with the keyword 150.

The keyword 150 may include any character combination, such as an alphanumeric combination for example, as provided by the user 104. For example, the keyword 150 may include a name of a record, a date, a measurement, an identification number, a name of a data source 120A-C or field 122, or any other values of the data 114 for which the user 104 wishes to search. It should be clear that the keywords may be associated with the names or designations of fields, records, etc. used in the database but that the keywords also can be associated with the data itself that is stored in the database, i.e., that keywords may correspond to fields of the associated dataset or may correspond to data stored in the fields of the associated dataset. The search box 152 may include a text box where the user 104 can enter the keyword 150 and/or may provide the user 104 recommended possible keywords 150.

The content index 156 may include a combination of values and/or data from the database 106, including values from the database schema 118, which can be used to identify data sets that match keywords entered by a user. For example, the content index 156 may include values from the tables 120A-C, fields 122 (including the names 124), the data 114 and/or the annotations 116. In this manner, the user may use the entered keywords to retrieve structural information about the database 106, for example to retrieve datasets from the database for use in formulating a graphical query 110. According to an example implementation, the content index 156 may be periodically updated, for example every evening and/or when the data of the database 106 is determined to have changed (e.g., since the time of the previous dictionary update). According to an example implementation, the content index 156 may be updated with the data 114 of the database 106 using query statements that pull the data 114 from the database 106. In various implementations, the content index 156 may be configured to include/exclude various portions of the database schema 118.

The search engine 154 then may search the content index 156 using one or more keywords 150 as provided by the user 104. The search engine 154 may try to match the keywords 150, including portions thereof, against the values stored in the content index 156. The search engine 154 then may return any entries from the content index 156 that are similar to or otherwise associated with the keyword 150 in the data source list 131. According to an example implementation, the search engine 154 may order the results by relevance based on the keyword 150. The data set results of this lookup operation then can be presented to the user, and the user can select a data set for use in the graphical query 110.

The traditional usage pattern for a database system involves the user leveraging his knowledge of the database schema to discover or extract a target set of data. In this system, the search engine 154 may allow the user to use knowledge of the data to discover the schema (reverse schema lookup). As discussed above, the search engine 154 may discover the database schema 118 of the database 106 from the data contained in the database schema. Content index 156 contains a three-way-lookup between data, fields and schema. Then when the user enters the keyword 150 into the search box 152, the search engine 154 may search the content index 156 for results that match the keyword 150. The results of the search may then be provided to the user in the data source list 131.

The search functionality may return not only matches or content that matches or resembles the keyword 150, but also structure from the database 106, corresponding to the matches. Rather than returning an entire document, the search functionality may return only those relevant portions of the database 106 from the database schema 118 that are related to the keyword 150 and have their own separate sub-structure.

For example, in a relational database, the search engine 154 may return all or a portion of the data 114 that matches the keyword 150 in the result list. In addition, the search engine 154 may return the structure surrounding the data 114, such as the column (e.g., field 122) and table (e.g., data source 120) that includes the data. The user 104 may then use the results of the search as components of the graphical query 110 to find additional or target data from the database 106. The results of the search (as presented in the data source list 131) may be combined with each other and/or the results of additional or subsequent searches. This manipulation of the search results may allow the user 104 to combine the results of the search engine 154, into a broader query (e.g., graphical query 110) for data from the database 106.

From the items in the data source list 151, the user 104 may select which items (if any) best correspond to the keyword 150 or concept for which the user 104 was searching. As indicated above, the items of the data source list 151 may include various dataset icons 132A-C corresponding to the matching data sources 120A-C, fields 122, data 114 and/or other datasets 130. Then for example, upon a selection of a data source list 151 item, the graphical query system 102 may determine the corresponding dataset 130 and provide this dataset icon or icons 132A in the graphical query 110. Thus, the search function (e.g., 152) may allow a user 104 who is unfamiliar with the data 114 of the database 106 to quickly and easily learn about the data 114 and build the graphical query 110 based on the schema of the data.

According to an example implementation, the search engine 154 may search the content index 156 not just for the keyword 150, but also synonyms or other related keywords for the keyword 150. The synonyms or other related keywords may include any words commonly associated with or that has a meaning similar to the keyword 150 provided by the user 104. For example, if the user 104 enters the keyword 150 "heart", then example synonyms may include "valve", "cardio", "arrest" and "bypass."

The search engine 154 may also suggest to the user 104, relationship matches from the content index 156. The relationship matches may be determined based on a selected icon or dataset 132A-C from the graphical query 110. For example, the user 104 may select (e.g., right-mouse click) the data set 138B to perform a manipulation (e.g., filter or combination) on the data of the data set 138B. Then for example, based on the selection, the search engine 154 may determine from the content index 156 and the relationship metadata 116A other data sets (not shown) from the database 106 that have a relationship with the selected data set 138B. This may allow the user 104 to more quickly determine what other data sets from the database 106, for which there are known relationships 116A, to use in the graphical query 110, for example, for filter and/or combination functions. The relationship matches or options may be presented to the user 104 in a natural language expression format based on the NLE metadata 116B.

The graphical query system 102, according to an example embodiment, may use the NLE metadata 116B to provide the user with a natural language expression 116B for the entire graphical query 110 as constructed by the user 104. This may allow the user 104, for example, to check the accuracy of the constructed graphical query 110 in a language that is more natural to the user. This provides the user 104 with an additional layer of proofing, in addition to the graphical nature of the query 110, dataset aliases, and the partial execution functionality.

The graphical query system 102 may simplify the creation of database queries for users 104 who may be unfamiliar with how data 114 of a database 106 is stored and/or how a query language, such as SQL, is used to generate a structured query 112 of the database 106. The graphical query system 102 may provide the user 104 natural language alternatives, as based on the metadata 116, that make designing the graphical query 110 more intuitive for the user 104 (e.g., versus providing the user 104 with database constructs and terminology). The graphical query system 102 may provide more layman-friendly descriptions of the resultant sets 138A, 138B and the operations 136A, 136B being performed, and may recommend combinable data sets 132A-B and/or fields 122 based on a selected operation 136A, 136B. The graphical query system 102 then may construct the structured query 112 from the graphical query 110 and query the database 106 for the target data.

Figure 2:
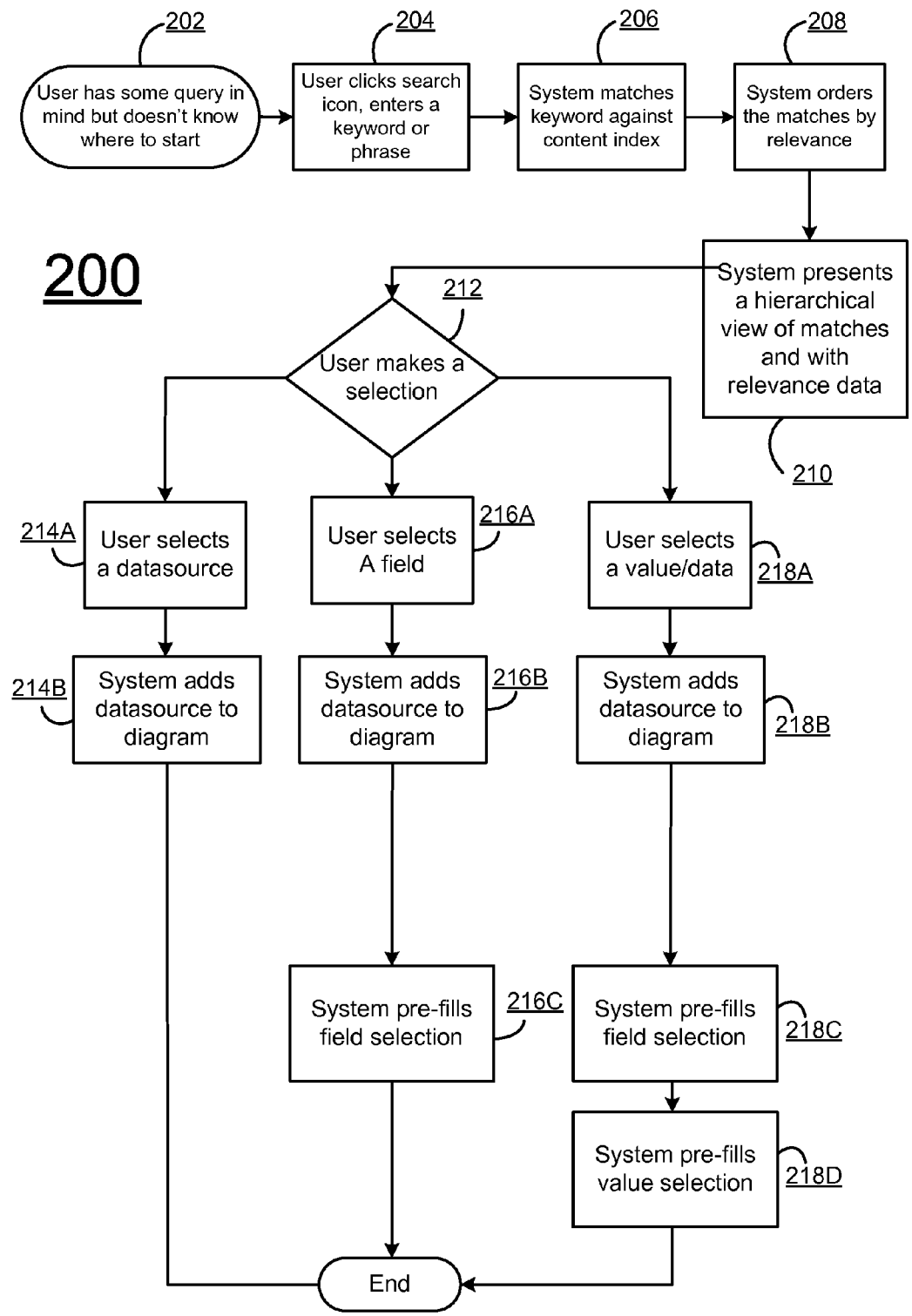
FIG. 2 is a flowchart illustrating example operations of the system of FIG. 1.

FIG. 2 is a flowchart illustrating example operations of the system of FIG. 1. More specifically, FIG. 2 illustrates an operational flow 200 representing example operations related to performing a search of the database schema 118 of FIG. 1.

In step 202, the user 104 may decide to build a query (e.g., 110). The graphical query system 102 may allow the user 104 to search for any words or values in which the user 104 may be interested to begin the graphical query building process. The user 104 may, for example, click on the search box 152 and enter a search phrase or keyword 150 (204). The search engine 154 may then match the keyword 150 against values stored in the content index 156 (206), and the search engine 154 may return the matches ordered by relevance (208). The search engine 154 then may present the results to the user 104 in a hierarchical view in the result or data source list 131 of the interface 108 (210).

The data source list 131 may include the matches from running a search for the keywords against the content index 156. For example, the data source list 131 of FIG. 1 may include three datasets 132A-C returned from the database 106. Each match in the data source list 131 may correspond to one of a data source 120A-C match, a field 122 match and/or a value or data 114 match. The resulting display on the graphical query 110 may vary depending on which match the user 104 selects as shown in the steps 214, 216 and 218.

If the user 104 selects a data source match (214A) from the data source list 131, the query engine 146 may add the selected dataset icon 132A for the corresponding table or view from the database 106 to the graphical query 110 (214B). If the user 104 selects a field result match from the data source list 131 (216A), the query engine 146 may add a dataset icon 132A for the corresponding data source 120A-C that includes the selected field. The query engine 146 then may pre-fill the selected field 122 and refine the dataset 132A accordingly (216C). For example, the query engine 146 may include the operation 136A that narrows the fields of interest from the dataset icon 132A to only the selected field 122. In another example, the query engine 146 may include the dataset icon 132A already refined to output only the selected field 122, e.g., showing only a single icon on the graphical query 110.

If the user 104 selects a data match from the data source list 131 (218A), the query engine 146 may add a dataset icon 132A for the corresponding data source 120A-C (218B), may pre-fill the corresponding field 122 selection as discussed above (218C), and may pre-fill the value or data 114 selection (218D). In various implementations, this may result in the graphical query 110 including one or multiple components representing the selections from the data source list 151.

Figure 3A:
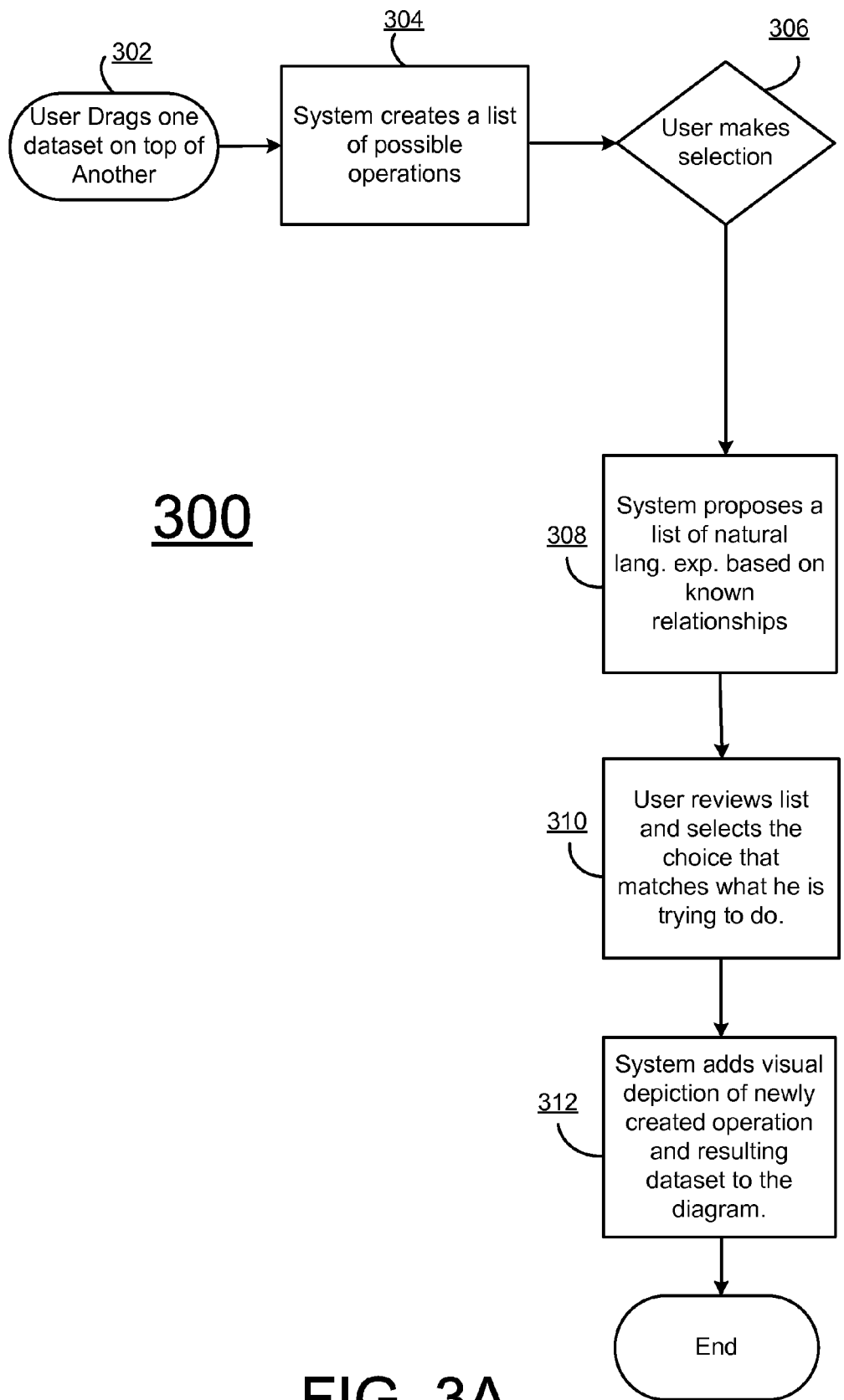
FIG. 3A is a flowchart illustrating example operations of the system of FIG. 1.

FIG. 3A is a flowchart illustrating example operations of the system of FIG. 1. More specifically, FIG. 3A illustrates an operational flow 300 representing example operations related to providing natural language expressions 116B to a user 104 of FIG. 1.

In step 302, the user 104 may drag a first dataset icon 132A on top of a second dataset icon 138A in a user interface displaying the graphical query 110. For example, in a graphical query 110 that includes a first dataset icon 138A the user 104 may drag a second dataset icon 132B from the data source list 131 and/or from the graphical query 110 and drop it on top of the dataset icon 138A. In other example embodiments, the user may perform actions other than a drag-and-drop to produce similar results in step 302.

The input handler 140 may receive an indication that the first icon 132B has been dropped on top of the second icon 138A. As explained above such an indication provides information about a selection 142 of data made by the user. The input handler 140 may provide the selection 142 to the query engine 146. The query engine 146 then may populate the data source list 131 (or other window or portion of the interface 108) with a list of possible operations (e.g., 136A-B) as determined from the metadata 116, as described above. The user 104 then may select an action (306).

The translation engine 144 then may propose a list of natural language expressions based on the relationships 116B (308). The natural language expressions may include any combinable fields as determined from the relationship metadata 116B, such as based on the set flags for selected operation. The system 102 then may propose to the user 104 the natural language expression 116B, using any user provided aliases 134, for any possible combinations based on the selected operation.

The user 104 then may select an operation from the data source list 131 that most closely resembles what the user 104 is trying to do (310). The query engine 146 then may add a visual depiction of the selected operation and any result sets being generated thereby on the graphical query 110 (312).

Figure 3B:
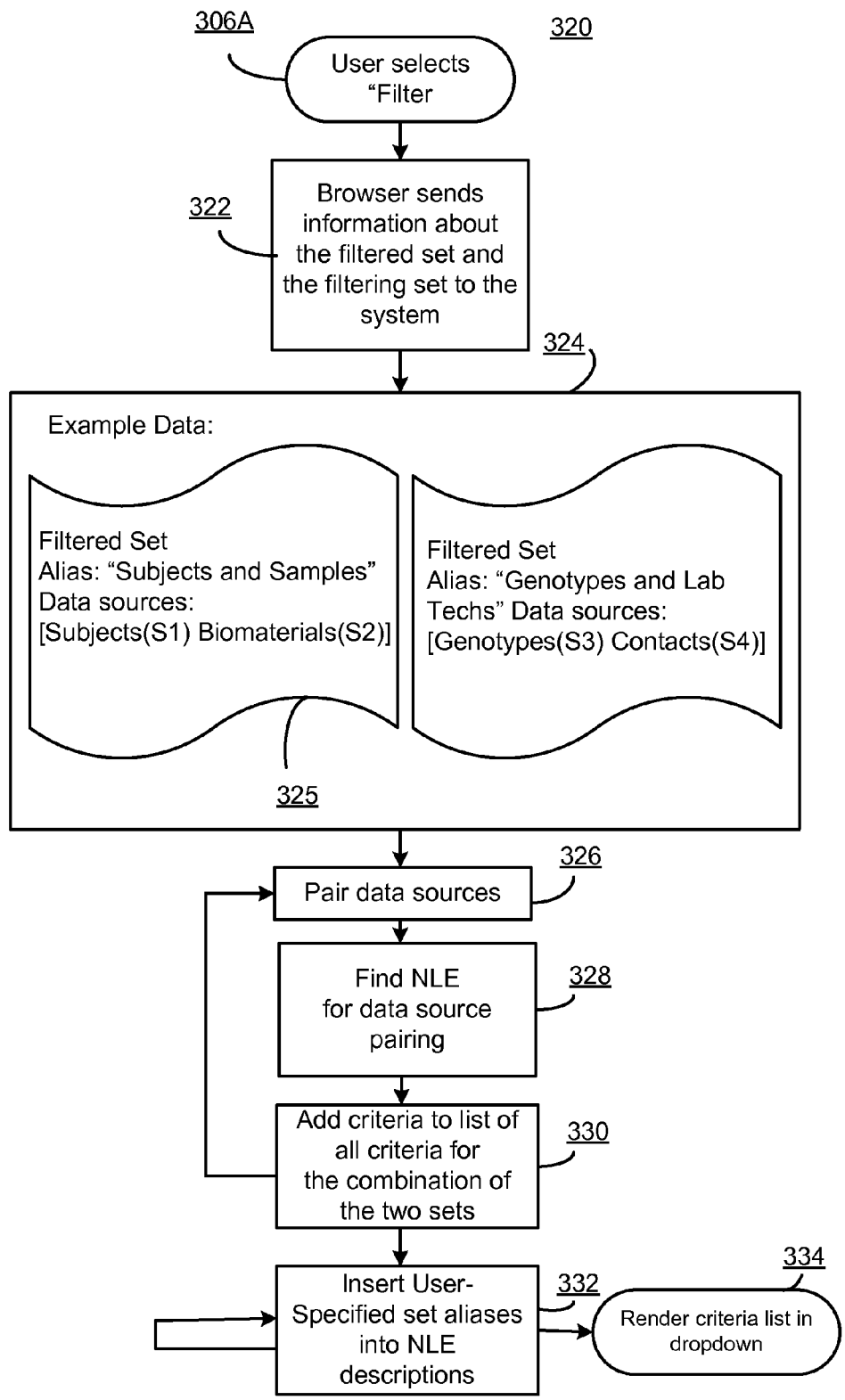
FIG. 3B is a flowchart illustrating example operations of the system of FIG. 1.

FIG. 3B is a flowchart illustrating example operations of the system of FIG. 1. More specifically, FIG. 3B illustrates an operational flow 320 representing example operations related to proposing natural language expressions as referenced above in step 308 of FIG. 3A as it relates more particularly to a filter operation. The filter operation may filter out from a first dataset, those records that do or do not match a second dataset. For example, the filter operation may match a first field in the first dataset against a second field in the second dataset and return those records from the first dataset that have the first field match those values or records of the second field in the second dataset.

In step 306A, the user 104 may select the filter operation. In step 322, the interface 104 may send, transmit or otherwise make available to the input handler 140 as the selection 142, information about the filtering set (e.g., dataset corresponding to the icon that was dragged and dropped) and the filtered dataset (e.g., the dataset onto which the filtering dataset was dropped). In one implementation the schema of the filtered set may be propagated through as a result of the filter operation.

For example, as shown in FIG. 5C, a filtering operation (e.g., 504B) may be performed on the datasets 502B (filtered set) and the dataset 506A (filtering set). The dataset 506A may include fields that correspond to the subjects datasource 502A, while the dataset 502B may include fields corresponding to the biomaterials datasource. Then for example, since the dataset 502B (filtered set) is filtered by the filtering set 506A, it is the fields of the filtered set 502B that would be propagated through to the resulting set 506B. If for example, 506A was the filtered set and 502B was the filtering set, then the result set 506B would include the fields or schema of the subjects data source 502A.

Returning to FIG. 3B, an example set of data 324 used in a filter operation includes a filtering dataset and a filtered dataset. Each dataset may include an alias 134 and a data source or title 133 information. According to an example implementation, the example data 324 may include local ids 325 for each data source. The local ids 325 may include an automatically generated identifier that uniquely corresponds to a data source or dataset node in the graphical query 110. Thus, for example, the data sources with titles 133 "Subjects" and "Biomaterials" may have the alias "Subjects and Samples" and the local id of "S1."

In step 326, the translation engine 144 may compare the fields of the selected data sources 130 against each other. For example, for each pair of fields, the translation engine 144 may match that pair against the metadata 116 to determine if a relationship 116A exists between the pair of fields. In step 328, if a relationship 116A is found, then the corresponding natural language expression (NLE) 116B may be added to a list of recommended combinations (330). The process then may return to step 326 until each pairing has been processed.

In step 332, the aliases 134, as provided by the user 104, may be inserted into the natural language expressions, and the resulting natural language expressions may be rendered in the data source list 151 (334).

Figure 4:
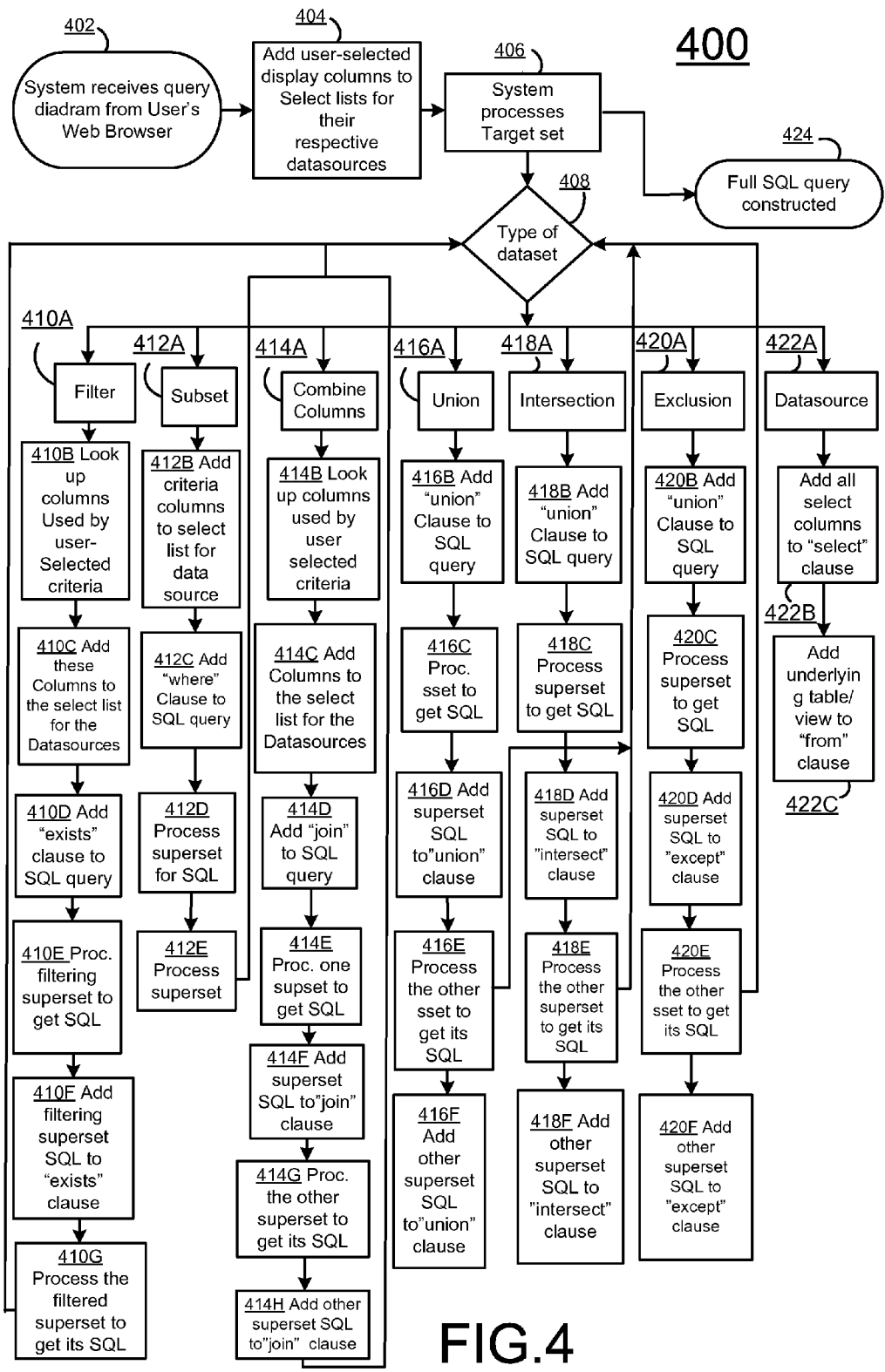
FIG. 4 is a flowchart illustrating example operations of the system of FIG. 1.

FIG. 4 is a flowchart illustrating example operations of the system of FIG. 1. More specifically, FIG. 4 illustrates an operational flow 400 representing example operations related to converting the graphical query 110 into the structured query 112 of FIG. 1.

In the example of FIG. 4, a user may have constructed a graphical query 110 and may choose to execute all or some of its components (e.g., perform a full or partial execution). As a result, the system 102 may perform the steps of the flowchart 400 in automatically constructing a structured query 112 that corresponds to the user-generated graphical query 110. The examples provided in FIG. 4 are directed to SQL queries, however it should be understood that SQL is provided as an exemplary query language and that other query languages may be used in other implementations.

The user may select an execute or query button on the interface 108 and the input handler 140 may receive information about the graphical query 110 from the interface 108 (402). For example, the user 104 may select a submit button on the interface 104 to indicate that the graphical query system 102 is to begin processing the graphical query 110. According to an example implementation, the user 104 may toggle (e.g., activate/enable or deactivate/disable) sub-portions or components of the graphical query 110 for a partial execution. In another implementation, the user may select a component of the graphical query 110 up to which point an execution is to be run. Then for example, the graphical query system 110 may only process those activated or enabled portions of the graphical query 110, and/or until the selected point of execution.

In step 404, the logic engine 148 may add columns to a selected column list. The selected column list may include a running account of which columns or fields of the database 106 are accessed or used in the graphical query 110. For example, each non-leaf or non-data source node of the graphical query 110 may use one or more columns from one or more tables or views of the database to perform a specific type of operation. These columns, as they are determined from processing each node of the graphical query 110 may be added to the selected column list. This addition to the selected column list may be performed with respect to the target data set in step 404, and in other datasets in steps 410C, 412B, and 414C as discussed below.

The system may then begin processing the target set (406). Processing the target set may include building at least a portion of the corresponding structured query 112 (e.g., as discussed above in FIGS. 5A and 5B).

In step 408, a type of dataset is determined. The type of dataset may be determined based on which operation(s) is performed that produces or results in the dataset. For example, as shown in FIG. 4, according to an example implementation, there may be seven different types of datasets. It should be understood however, that those types of datasets shown and discussed are merely exemplary and not intended to be limiting and that other example embodiments may include different and/or additional types. For example, if a dataset is the result of a filter operation, the filter path 410A may be followed. Similarly, if a dataset is a data source (e.g., selected from the data source list 151) and not stemming from an operation on another superset, then the data source path 422A may be followed.

Several types of sets that may appear in the graphical query are shown in FIG. 4. A filter set (410A) may include a result set that is the result of filtering a first dataset by a second data set, and returning a portion of the first dataset that is determined by the presence or absence of corresponding entries in the second dataset. The first step of the filter path may include looking up columns used by the user-selected operation or criteria (410B). For example, the columns may include those columns selected by the user to be returned in the result set. These columns may then be added to the selected columns list (410C), which may be similar to step 404 as discussed above.

In step 410D, an "exists" clause may be added to the structured query. An example "exists" clause is shown in FIG. 6B. The "exists" clause may be used to return those rows (e.g., data 114) that make a particular condition true. For example, the structured query code "WHERE EXISTS (SELECT * FROM Teams WHERE Mascot="Tigers"") may return those teams whose mascots are tigers. If for example, no team has Tigers as their mascot, then no records or data may be returned.

In step 410E, the filtering superset is processed. For example, as shown in FIG. 5C, the filtering superset in the filter operation 504B may include the dataset 506A. Processing the filtering superset may include returning to step 408 and determine what type of set is the filtering superset. Another "exists" clause may be added to the structured query (410F), at which point the filtered superset may be processed (410G).

Referring back to FIG. 5C, following the result node 506B, the filtering superset 506A may be processed, followed by its superset and data source node 502A. After the completion of processing data source node 502A, the processing may recurse back to the filtering node 506A, and then finally the filtered node 502B. In other example embodiments however, the order of the processing of the components or nodes of the graphical query 500 may vary.

Returning to FIG. 4, a subset (412A) may include selected columns of a dataset superset. For example, the subset of a superset may include returning only those records that have a field matching a particular user-provided value or parameter. For example, as shown in FIG. 5C, the result set 506A may be a subset of subjects 502A, which includes only those records whose study code="Demo."

In step 412B, the criteria columns may be added to the selected columns list (similar to what was discussed above in reference to step 404). In step 412C, a "where" clause may be added to the structured query. The superset may be processed to obtain the structured query code (412D). In step 412E the superset may be processed, whereby the type of set may be determined in step 408 and the process may repeat.

A combine columns set (414A) may include an operation that is similar to a SQL join operation that combines fields from two tables using values that are common to each. Steps 414B and 414C may be similar to 410B and 410C, in that those columns from the resulting dataset may be identified and added to the selected columns list. In step 414D, a "join" clause may be added to the structured query. In step 414E, one superset may be processed, and in step 414F it may be added to the "join" clause. In step 414G, the other superset may be processed, and it may be added to the "join" clause (414H). A "join" clause may be used in structured queries to query data from two or more tables (including views) whose columns share some relationship. For example, the result of a "join" clause may include records where there is a match between a column of a first table and a column of a second table.

A union set (416A) may include the records of a union of two or more datasets. In step 416B, a "union" clause may be added to the structured query. In step 416C, one of the supersets and the superset SQL may be added to the structured query (416D). In step 416E, the other superset may be processed and its structured query may then be added to the structured query as part of the "union" clause (416F). A "union" clause may be used in structured queries to combine the result sets of two or more individual queries. For example, the result of a "union" clause may combine the output of two SELECT clauses into a single output table.

An intersection set (418A) may include records that are the intersection of two or more datasets. In step 418B, a "intersect" clause may be added to the structured query. In step 418C, one of the supersets and the superset SQL may be added to the structured query (418D). In step 418E, the other superset may be processed and its SQL may then be added to the structured query as part of the "intersect" clause (418F). An "intersect" clause may be used in SQL to return the results of two or more SELECT queries. For example, the result of an "intersect" clause may only include those records that exist in both queries (whereby the "union" clause may return values that exist in either one of the queries).

An exclusion set (420A) may include records that are the exclusion of data of two or more datasets. For example, a result set may include those records from a first dataset that do not appear in a second dataset. In step 420B, an "except" clause may be added to the structured query. In step 420C, one of the supersets and the superset SQL may be added to the structured query (420D). In step 420E, the other superset may be processed and its SQL may then be added to the structured query as part of the "except" clause (420F). An "except" clause may be used in SQL to identify values found in a first query that do not exist in a second query. For example, the result of an "except" clause being placed between a first query (operand) and a second query (operand) may include those records from the first query that do not exist in the second query.

If the dataset does not stem from an operation being performed on a superset, then the dataset may be a data source and follow the data source path 422A. A data source or source set (422A) may include any dataset that corresponds to a data source 120A-C (e.g., table/view) of the database 106.

In step 422B, all the columns from the selected column list may be added to the "select" clause (e.g., from steps 404, 410C, 412B, 414C) in the structured query 110 corresponding to the selected data source node. In step 422C, the "from" clause of the structured query 110 may be filled in with the data source information. Then for example, once all the nodes of the graphical query have been processed in full (e.g., all recursive calls have completed and returned), the processing may go back up to step 406, where final processing is done on the target set and the full structured query 112 is completed in step 424.

FIGS. 6A-6C are example SQL operations that may be performed by the SQL code that is generated by converting the graphical query 500 of FIG. 5C into a structured query 112. More specifically, FIG. 6A is example SQL code (i.e., a SQL substatement) that may be generated as a result of initial processing of the target set 508. FIG. 6B is example SQL code that may be generated as a result of initial processing of the result set 506B, after having processed the target set 508 of FIG. 6A. FIG. 6C is an example structured query 112 that may be generated as a result of processing the nodes of the graphical query 500. The SQL code as provided in FIGS. 6A-6C is provided only as an exemplary implementation, and it should be understood that the system 102 may operate using other query languages as well.

In FIG. 6A, the SQL 602 may include a select, from and where clause, whose functions have been described above. The system 102 may associate the target set 508 with the local identifier S3. As indicated in the selected columns list 604, S3 may correspond to the Biomaterials data source (e.g., from the database 106). Each data source icon 502B and 502A S3 may be identified or referred to within the system by a local identifier. In this example, the subjects data source may include the local identifier S2, and the biomaterials data source may include the local identifier S3. The target set 508 may include records and/or fields from the biomaterials data source 502B.

As shown in the graphical query 500, the target set 508 may include those records whose type="Blood." In the SQL 602, this may translate into the clause "where S3_biomaterial_type=?," where the "?" may be replaced by "Blood" during an execution of the structured query 602. Then for example, the selected field "biomaterial_type" may be added to the selected column list 604 in association with its corresponding data source "Biomaterials" that has the local identifier S3.

The selected columns list 604 may include a running tally or enumeration of all the fields or columns of the database whose values are accessed and their corresponding tables or views (e.g., datasources). In this example, the column biomaterial_type is used in the target set 508, which comes from the data source biomaterials which includes the local id S3.

In FIG. 6B, additional SQL code (e.g., query statement) for the processing of result set 506B may be shown. It may be determined for example, that the operation 504B is a filter operation. Then for example, as discussed above in FIG. 4, an "exists" clause may be added to the SQL 602. The exists clause may be followed by additional select, from, and where clauses. The where clause may include an SQL command that translates into filtering the biomaterials 502B (filtered) dataset by the subjects in demo 506A (filtering) dataset. Additionally since the result set 506B includes an operation using columns from both the Biomaterials and Subjects data sources, these fields may be added to the selected columns list 604.

In FIG. 6C, a complete structured query 112 is shown for all the components of the graphical query 500 of FIG. 5C, including a complete selected columns list 604. The SQL 602 of FIG. 6B, shows example SQL produced after processing the query components 506B and 508. The example structured query 112 may show a completed structured query that is the result of processing the target set 508, followed by the result set 506B, result set 506A, the data source 502A, and the data source 502B. In other example embodiments however it may be understood that the sequence of the processing of the components of the graphical query 500 may vary, which may produce varying or alternatively ordered SQL code in the structured query 112. In this example, the structured query 112, may also include the SQL code discussed above in FIGS. 5A and 5B, as those components were portions of the graphical query of FIG. 5C.

FIG. 7A is a block diagram of an example operation of the system of FIG. 1. Box 702 is an example of a box, window or pop-up that may be generated or produced by the graphical query system 102 as a result of a drag and drop operation. For example, referring to FIG. 1, from the graphical query 110, the icon 132B may be dragged and dropped onto the icon 138A, which may produce a pop-up or other menu box or box similar to box 702 of FIG. 7A.

Box 702 may provide the user with querying options based on a selection of one or more boxes from the graphical query 110. Box 702, as shown, provides the user with combine and filter options, however other example embodiments may include other querying options or calculations. The box 702 includes example NLE metadata 116B for the filter option and the combine columns option.

If the user selects the combine columns option, then the user may be presented with box 704. The criteria field of box 704 may provide the user with one or more options associated with the selected operation (e.g., combine columns). Then for example, upon making a selection from the criteria field, the user may select the apply button which may cause the query system 102 to generate corresponding icons and/or representations of the selected criteria on the graphical query 110.

If the user selects the filter option from box 702, the user may be provided with box 706. Box 706 and box 704 may be similar, except box 706 may correspond to the filter option. Similarly, the user may select a filter option from the criteria drop down list. The query system 102 may determine the criteria based on the metadata 116, including the relationship data 116A. The user may select one of the filter options and select the apply button, which may cause the system 102 to generate the corresponding depiction of the selected option on the graphical query as shown in FIG. 7B.

Figure 7B:
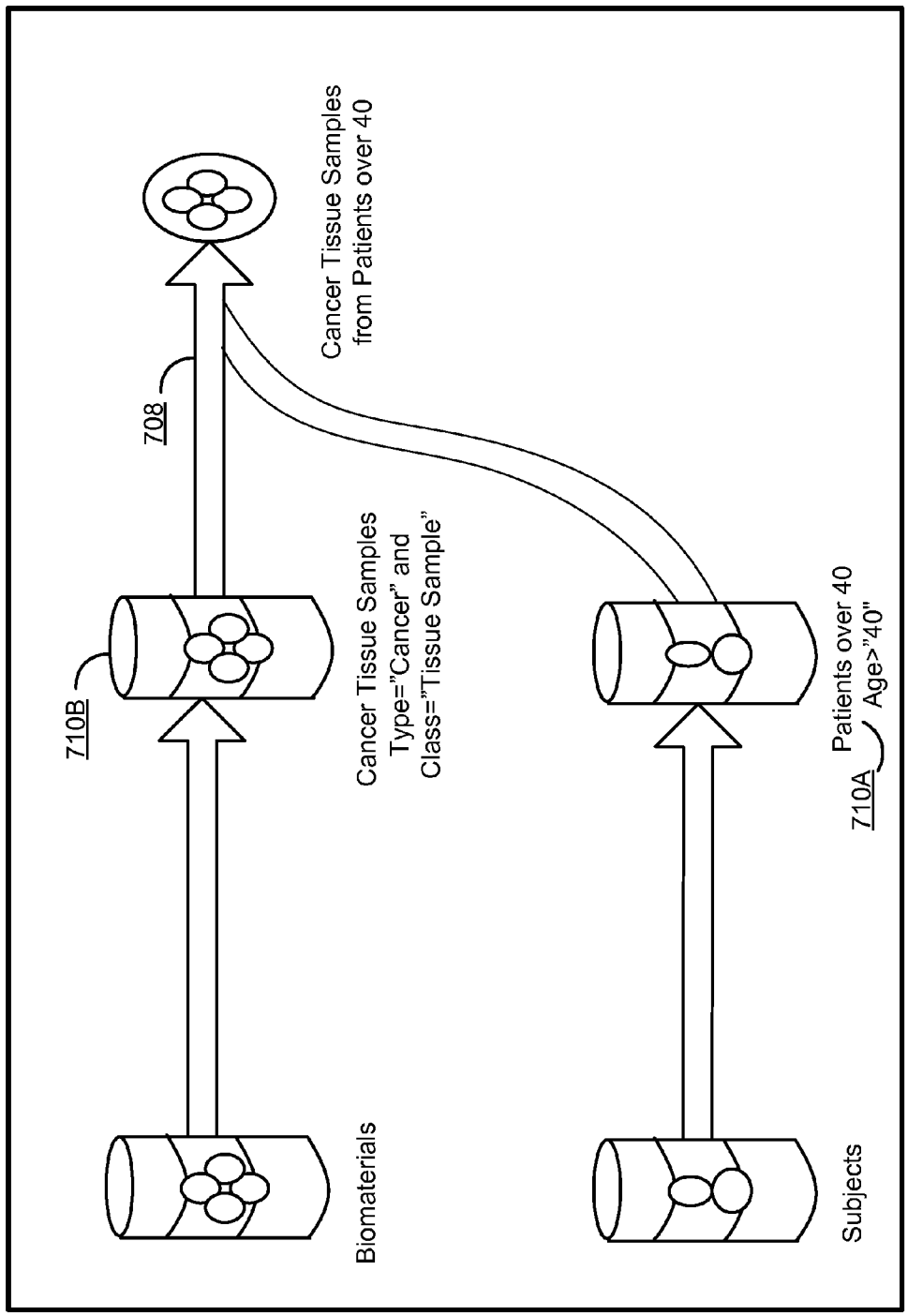
FIG. 7B is a block diagram of an example graphical query, according to an example implementation.

FIG. 7B is a block diagram of an example graphical query 110, according to an example implementation. The graphical query 110 of FIG. 7B shows an exemplary graphical query corresponding to the selection of a filter option from the box 706 of FIG. 7A. As referenced above, the box 702 may be generated as a result of dragging item 710A onto 710B. Then for example, the result of the selection of filter and the apply button may generate the operation 708 on the graphical query.

FIG. 8 is a block diagram of an example result of a keyword search operation of the system of FIG. 1. As discussed above, the query system 102 may include search functionality 152. The search functionality 152 may allow a user to enter any character combination, such as an alphanumeric combination, keyword 150 by which to search a content index 156 to perform a reverse schema lookup to allow the user to discover and identify data sources, datasets, and database structures for use in a query based on natural language queries. In this manner, the user need not be familiar with the specific database structures to be able to utilize effectively the database structures to build and run query a useful to the user In the example of FIG. 8, the user may have entered the keyword 150 "Cancer" into the search box 152. The search engine 154 may have searched the content index 156 and returned the results (e.g., datasets 132) in the result list 131. The result list may include any or all database structures that include a field or data related to the keyword "Cancer." Such relations also can be identified by metadata linking the keyword to the data source, field, or data. For example, the "Study Description" dataset of the "Subjects" data source may include 80 records with the Study Description parameter having the value "Molecular profiling of Breast Cancer," and may include 52 records with the Study Description parameter having the value "Prostate cancer analyses—genomic and proteomic profiling." The "Study Code" dataset of the "Subjects" data source may include 15 records with the Study Code parameter having the value "Cancer." From the result list 131, the user may select any of the datasets 132 to include in a graphical query 110. For example, if the user selects the "Cancer" hyperlink then an icon representing a dataset of Subjects having the Study Code with a value equal to "Cancer" may be placed in the canvas of the graphical query for the user to utilize in building and running a query.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the implementations.

What is claimed is:
1. A system comprising:
one or more processors;

a database schema including a plurality of data sources, each data source including one or more fields for storing data, and metadata defining relationships amongst the fields within or between data sources;

a schema parser executed by at least one of the processors and configured to determine one or more datasets of data stored within or referenced from the database schema, wherein a dataset includes one or more fields from the database schema and represents the data stored in the one or more fields;

an input handler executed by at least one of the processors and configured to receive a user's selection of one or more of the datasets via a graphical user interface, wherein the input handler is configured to determine that a first graphical icon representing a first dataset is graphically associated within the graphical user interface with a second graphical icon representing a second dataset;

a translation engine executed by at least one of the processors and configured to provide operations for refining the data of the selected datasets into a result set via a query, wherein the translation engine is configured to determine natural language queries to provide based on the relationships identified by the metadata, the natural language queries including intuitive descriptions of the operations based on the relationships identified by the metadata and an experience level of the user, the intuitive descriptions being different for users with different experience levels, wherein the translation engine is configured to provide, responsive to the graphical association of the first and second icons, natural language queries to perform between the first dataset and the second dataset, wherein the natural language queries are determined based on the relationships of the datasets as stored or derived from the metadata, wherein the input handler is configured to receive a selection of one of the natural language queries provided by the translation engine; and a query engine executed by at least one of the processors and configured to provide a graphical depiction of the query via the interface, the graphical query including operational flow indicators indicating a directional flow of the query from the selected datasets with the selected natural language query resulting in the result set.

2. The system of claim 1 wherein the schema parser is configured to determine the datasets based on one or more keys from each data source, wherein the metadata describes the relationship amongst the keys of the data sources.

3. The system of claim 1, wherein the natural language query includes an alias for the selected datasets as provided by the user.

4. The system of claim 1 wherein:
graphically associating the first icon with the second icon includes dragging the first icon and dropping the first icon onto the second icon.

5. The system of claim 4, wherein, in response to the input handler receiving a selection of one of the provided natural language queries, the query engine is configured to provide a graphical depiction of the query via the interface, the graphical query including a third icon representing a third dataset formed in response to the selected natural language queries, the third icon being connected to the first and second icons by one or more operational flow indicators indicating a directional flow of the query from the first and second datasets to the third dataset.

6. The system of claim 1 wherein the input handler is configured to receive a selection of a first graphical icon representing a first dataset and the query engine is configured to provide the first graphical icon representing the first dataset in the graphical query.

7. The system of claim 1 wherein the input handler is configured to receive an alias to at least one of the selected datasets in the graphical query, wherein the alias includes a user-provided name for the selected datasets.

8. The system of claim 1 further comprising a logic engine configured to assemble a machine readable structured query based on the graphical query.

9. The system of claim 8 wherein the machine readable structured query includes a structured query language (SQL) query.

10. The system of claim 8 wherein the logic engine is configured to process elements of the graphical query, beginning with the result set and proceeding to the data sources, to assemble the structured query.

11. The system of claim 8 wherein the logic engine is configured to execute the structured query against the database and return only results to which the user is allowed access based on an access control list (ACL).

12. The system of claim 9 wherein the logic engine is configured to:
determine a local identifier corresponding to a selected dataset from the graphical query;
determine one or more fields of the selected dataset associated with the operation for refining the data of the selected dataset;
determine the natural language query corresponding to the one or more fields of the selected dataset; and
provide the local identifier, the one or more fields of the selected dataset, and the operation in the structured query language (SQL) query.

13. The system of claim 9 wherein:
the logic engine comprises a plurality of different subroutines, each different subroutine being configured to process a different type of operation represented by a particular type of element in the graphical query to generate a SQL substatement of the element's operation;
the logic engine is further configured to process elements in the graphical query, beginning with the result set and proceeding to the data sources, to identify columns of the data sources referenced by the SQL substatements and to add those columns to a SQL SELECT statement produced by the subroutine that processes data source elements; and
the logic engine is further configured to incorporate the SQL substatements into a complete machine readable SQL query.

14. The system of claim 1 wherein the database schema includes a plurality of database objects of a database.

15. The system of claim 14 wherein the database objects include tables having one or more columns for storing the data.

16. The system of claim 14 wherein the database objects include database views having one or more columns representing the data.

17. The system of claim 1, wherein the system is configured to generate additional metadata based on user interaction with the input handler.

18. A computer-implemented method of constructing a query with which to retrieve information from a database, the method comprising:
receiving one or more keywords input from a user;
determining, by at least one processor of a computer system, a first dataset identified in a schema of the database based on the received one or more keywords and metadata associated with the first dataset;

determining, by at least one processor of the computer system, a second dataset identified in the schema of the database based on input from the user and metadata associated with the second dataset;

representing graphically, by a display of the computer system, the determined first dataset as a first icon and the determined second dataset as a second icon in a canvas presented to the user;

receiving information that the user has graphically associated the first icon with the second icon on the canvas;

in response to the user's graphical association of the first and second icons, generating a combination dataset of the first and second datasets;

representing graphically the combination dataset as a third icon in the canvas and representing graphically in the canvas a relationship between the combination dataset and the first and second datasets;

presenting a natural language query to the user, the natural language query including an intuitive description of a query based on the relationship between the combination dataset and the first and second datasets and an experience level of the user, the intuitive description being different for users with different experience levels;

receiving a selection of the natural language query from the user;

constructing, by at least one processor of the computer system in response to receiving the selection of the natural language query from the user, a machine-readable structured query based on the first dataset, the second dataset, the combination dataset and the relationship between the first dataset, the second dataset, and the combination dataset; and returning data from the database, the returned data corresponding to an execution of the machine-readable structured query against the database.

19. The method of claim 18, wherein the one or more keywords correspond to a data source, metadata of the first dataset, a field of the first dataset, or data stored in a field of the first dataset.

20. The method of claim 19, wherein the determination of the first dataset is based on a comparison of the one or more input keywords and metadata associated with a data source, metadata of the first dataset, a field of the first dataset, or data stored in a field of the first dataset.

21. The method of claim 18, wherein determining a first dataset comprises:

presenting to the user a plurality of potential first datasets identified in a schema of the database based on the input keywords, wherein the identified first datasets include data source metadata, field metadata, data value metadata, or data values that correspond to the one or more keywords; and receiving a selection by the user of the first dataset from the plurality of potential first datasets.

22. The method of claim 18, wherein the natural language query includes verbs and nouns based on the relationship between the combination dataset and the first and second datasets and metadata in the schema defining the relationship between the combination dataset and the first and second datasets.

23. The method of claim 18, wherein the graphical association of the first graphical icon and the second graphical icon includes dragging and dropping the first graphical icon onto the second graphical icon within the display.

24. The method of claim 18 wherein constructing the structured query comprises constructing the structured query based on a depth-first analysis of the graphical association of the first and second icons.

25. A method of constructing a query with which to retrieve information from a database, the method comprising:

representing graphically a first dataset of a database as a first icon and a second dataset of the database as a second icon in a canvas presented to a user on a display of a computer system;

receiving an indication to combine the first dataset with the second dataset, wherein the indication is received in response to the first icon being graphically associated with the second icon in the canvas;

based on the received indication and metadata associated with the first dataset and the second dataset, presenting to the user on the display of the computer system natural language query options for combining elements of the first and second datasets, the natural language query options including intuitive descriptions of the combining elements based on the metadata and an experience level of the user, the intuitive descriptions being different for users with different experience levels;

in response to the user's selection of one of the presented natural language query options, generating a third icon in the canvas representing a combination dataset of elements of the first and second datasets;

representing user-defined relationships between the first and second datasets and the combination dataset as a connected graph of the first, second and third icons, wherein the connected graph presents a graphical representation of the query to the user;

constructing, by at least one processor of the computer system, a machine-readable structured query based on the connected graph; and returning data from the database, the returned data corresponding to an execution of the machine-readable structured query against the database.

26. The method of claim 25, wherein receiving the indication comprises receiving a selection of the second icon in the canvas.

27. The method of claim 25, wherein receiving the indication comprises:

receiving a selection of the first icon; and providing, responsive to the selection, one or more related datasets that share a relationship with the first dataset, the one or more related datasets including the second dataset.

28. The method of claim 25, wherein the natural language query options are based on the metadata and the structure of the machine-readable structured query.

29. The method of claim 25, wherein the graphical representation of at least one of the datasets is based on:

receiving one or more keywords input from a user; and determining the dataset in a schema of the database based on the one or more keywords.

30. The method of claim 25, wherein the user's selection of one of the presented natural language query options includes a selection to filter the second dataset through the first dataset to create the combination dataset, which includes only records from the first dataset having a corresponding record in the second dataset.

31. The method of claim 25, wherein the user's selection of one of the presented natural language query options includes a selection to combine columns of the first and second datasets to create the combination dataset, which includes columns found in the first and second datasets that are chosen based on criteria specified by the user, wherein the method further comprises receiving the specified criteria from the user.

32. The method of claim 25, wherein the user's selection of one of the presented natural language query options includes a selection to create the combination dataset as a union of the first and second datasets, which includes all records from the first and second datasets.

33. The method of claim 25, wherein the user's selection of one of the presented natural language query options includes a selection to create the combination dataset as an intersection of the first and second datasets, which includes only records that are in both the first and second datasets.

34. The method of claim 25, wherein the user's selection of one of the presented natural language query options includes a selection to create the combination dataset as an exclusion of the first and second datasets, which includes all records that are in the first dataset but not in the second dataset.

35. A system comprising:
one or more processors;
an input handler executed by at least one of the processors and configured to receive a keyword by which to search a content index of a database for a corresponding data source from a plurality of data sources associated with the database, the data sources including metadata, fields and data populating the database;
a search engine executed by at least one of the processors and configured to search the content index for the keyword, and to provide metadata from the content index corresponding to the keyword;
the input handler being configured to receive a selection from the metadata;
a query engine executed by at least one of the processors and configured to provide, responsive to the selection of the metadata, a first graphical icon in a graphical user interface, the first graphical icon representing the selected metadata, and to provide in the graphical user interface a second graphical icon representing a corresponding data source,
wherein the input handler is configured to determine that the first graphical icon is graphically associated within the graphical user interface with the second graphical icon; and
a translation engine configured to provide, responsive to the graphical association of the first and second graphical icons, a list of natural language queries to perform between the selected metadata and the data source, the natural language queries including intuitive descriptions of the natural language queries based on the selected metadata and an experience level of the user, the intuitive descriptions being different for users with different levels of experience,
wherein the query engine is configured to query the database using query parameters based on the data source and a natural language query selected from the list of natural language queries.

36. The system of claim 35, further comprising a schema parser configured to identify the data source corresponding to the keyword based on the selection, wherein:
the schema parser identifies the data source.

37. The system of claim 35 wherein the search engine is configured to provide a list of data sources based on level of relevance between each data source and the keyword.

38. The system of claim 35 wherein determining that the first graphical icon is graphically associated within the graphical user interface with the second graphical icon includes determining that the first graphical icon has been dragged and dropped on the second graphical icon within the graphical user interface.

39. The system of claim 35 wherein the search engine is configured to assemble the content index from the database, the content index including the data sources, fields and data of the database.

40. The system of claim 35 wherein the search engine is configured to return, from the database, data corresponding to the keyword and a structure of the database where data is stored, the structure including the data source and field.

41. A computer-implemented method comprising:
determining, by at least one processor of a computer system, based on metadata associated with data of a database, a plurality of natural language expressions (NLEs) describing operations that may be performed on one or more datasets associated with a graphical query that is displayed to a user through a graphical user interface on a display of the computer system, the plurality of NLEs including intuitive descriptions of the operations based on the metadata and an experience level of the user, the intuitive descriptions being different for users with different levels of experience;
determining, from the graphical query, one or more aliases corresponding to one or more of the datasets, wherein the one or more aliases include a user-provided phrase by which to refer to the corresponding one or more datasets;
providing the plurality of NLEs that describe the operations that may be performed on the one or more datasets, including the one or more aliases corresponding to the one or more datasets presented to the user via the graphical user interface;
receiving a selection by the user of one of the provided plurality of NLEs; and
rendering, in the graphical query, a graphical depiction of the selected NLE on the one or more datasets.

42. The method of claim 41 wherein the rendering comprises rendering, in the graphical query, a result set appearing as a result of performing the selected NLE on the one or more datasets.

43. The method of claim 41 wherein determining which of a plurality of operations may be performed comprises determining the operations based on a relationship between keys associated with data sources of the database corresponding to the datasets.

44. A computer-implemented method comprising:
providing a graphical user interface displayed to a user on a display of a computer system, the interface being configured to allow the user to generate a graphical representation of a structured query for data of a database;
receiving, via the graphical user interface, selections of dataset icons corresponding to respective datasets of the database, indications of graphical associations between two or more dataset icons, and operations to perform on the datasets, wherein at least one of the operations is a natural language query that is selected from a plurality of operations that are provided based on metadata associated with the respective datasets of the database and an indication of a graphical association between the two or more dataset icons, the natural language query including an intuitive description of at least one operation based on the metadata and an experience level of the user, the intuitive description being different for users with different levels of experience;

generating, by at least one processor of the computer system, the graphical representation of the structured query in the graphical user interface based on the selections of the dataset icons and the operations to perform on the datasets, the graphical representation including the dataset icon and/or a representation of a selected operation;

generating, by at least one processor of the computer system, the structured query based on the graphical representation;

executing the structured query against the database; and providing results of the execution of the structured query.

45. The method of claim 44 wherein the receiving comprises determining, from amongst the selections, a target set of data from the database to be returned from the execution.

46. The method of claim 44 wherein generating the graphical representation comprises generating a directional flow indicator for each selected operation, indicating an operation to be performed on one or more of the selected dataset icons.

47. The method of claim 46 wherein generating the structured query comprises generating the structured query based on the directional flow indicators.

48. The method of claim 44 wherein generating the graphical representation comprises receiving a new placement of a selected dataset icon within the graphical representation, wherein the new placement does not change the generated structured query.

* * * * *

UNITED STATES PATENT AND TRADEMARK OFFICE
CERTIFICATE OF CORRECTION

PATENT NO. : 9,798,748 B2  
APPLICATION NO. : 13/732347  
DATED : October 24, 2017  
INVENTOR(S) : Brocato et al.

Page 1 of 1

It is certified that error appears in the above-identified patent and that said Letters Patent is hereby corrected as shown below:

On the Title Page

Column 1, Item (72), in "Inventors", Line 3, delete "Elliot" and insert -- Ellicott --, therefor.

Signed and Sealed this
Thirteenth Day of February, 2018

Andrei Iancu
*Director of the United States Patent and Trademark Office*